United States Patent
Kato et al.

(10) Patent No.: US 7,302,328 B2
(45) Date of Patent: Nov. 27, 2007

(54) STEERING CONTROL APPARATUS FOR VEHICLE AND METHOD FOR STEERING CONTROL

(75) Inventors: Hiroaki Kato, Hekinan (JP); Minekazu Momiyama, Chiryu (JP); Yoshiyuki Yasui, Nagoya (JP); Hiroaki Aizawa, Anjo (JP); Hiroaki Niino, Toyota (JP)

(73) Assignees: JTEKT Corporation, Osaka (JP); Advics Co., Ltd., Kariya-shi (JP)

( * ) Notice: Subject to any disclaimer, the term of this patent is extended or adjusted under 35 U.S.C. 154(b) by 594 days.

(21) Appl. No.: 10/960,226

(22) Filed: Oct. 8, 2004

(65) Prior Publication Data

US 2005/0080532 A1    Apr. 14, 2005

(30) Foreign Application Priority Data

Oct. 10, 2003    (JP)    ............ 2003-352372

(51) Int. Cl.
B62D 5/04    (2006.01)
B62D 6/00    (2006.01)

(52) U.S. Cl. ............... 701/41; 701/42; 701/83; 180/443

(58) Field of Classification Search ............ 701/41, 701/42, 70, 78, 83, 89, 48, 72, 90; 180/443, 180/412, 413, 415; 303/191
See application file for complete search history.

(56) References Cited

U.S. PATENT DOCUMENTS 5,316,379 A    5/1994 Becker et al.
5,408,411 A *    4/1995 Nakamura et al. ............ 701/48
6,158,826 A *    12/2000 Yasuda ............ 303/191
2002/0013646 A1*    1/2002 Nishizaki et al. ............ 701/41
2006/0041366 A1*    2/2006 Kato et al. ............ 701/72

FOREIGN PATENT DOCUMENTS

| DE | 40 38 079 A1 | 6/1992 |
|---|---|---|
| DE | 101 25 720 A1 | 12/2001 |
| EP | 1 293 412 A2 | 3/2003 |
| JP | 2000-62597 | 2/2000 |
| JP | 2000-108863 | 4/2000 |
| JP | 2001-334947 | 12/2001 |
| JP | 2002-254964 | 9/2002 |
| JP | 2003-291838 | 10/2003 |
| WO | WO 02/074638 A1 | 9/2002 |

OTHER PUBLICATIONS

Jürgen Akermann, et al., Fahrsicherheit durch robuste Lenkregelung, vol. 44, No. 5, XP-000583464, May 1996, pp. 219-225.

* cited by examiner

Primary Examiner—Tan Q. Nguyen
(74) Attorney, Agent, or Firm—Oblon, Spivak, McClelland, Maier & Neustadt, P.C.

(57) ABSTRACT

A steering control apparatus obtains a steered amount by which a steered wheel is steered based on a left-and-right braking force difference control amount, a vehicle state control amount, and a steering control amount. The apparatus changes the magnitude of the braking force difference control amount and the magnitude of the vehicle state control amount according to a vehicle speed or to time elapsed from when braking started to be applied to the left and right wheels. Accordingly, the vehicle driving on a μ-split road is prevented from being deflected toward a side of higher friction coefficient due to the left-and-right braking force difference when the braking is applied.

16 Claims, 17 Drawing Sheets

STEERING CONTROL APPARATUS FOR VEHICLE AND METHOD FOR STEERING CONTROL

CROSS-REFERENCE TO RELATED APPLICATIONS

This application is based upon and claims the benefit of priority from prior Japanese Patent Application No. 2003-352372, filed on Oct. 10, 2003, the entire contents of which are incorporated herein by reference.

BACKGROUND OF THE INVENTION

The present invention relates to a steering control apparatus that controls the attitude of a vehicle and method for steering control.

A road surface having different friction coefficients in left and right sections is referred to as a surface with split coefficient of friction, that is, a μ-split road surface. When hard braking is applied to a vehicle on such a μ-split road surface, and antiskid control is executed, the generated braking force is different in the left and right sides of the vehicle. Due to the difference of the braking force in the left and right sides, that is, left-and-right braking force difference, yaw moment is generated which deflects the vehicle toward the side with a higher friction coefficient. On a typical μ-split road surface of an actual road, for example, the friction coefficient of the road surface is lowered due to snow and ice remaining on the road shoulder, and is increased in a central section of the road due to dry or wet asphalt. If a vehicle driving on such a surface with left and right wheels on the road shoulder and the central section, respectively, is abruptly stopped, the braking force is greater in the central section, where the friction coefficient is high, than in the road shoulder, where the friction coefficient is low. As a result, yaw moment is generated in the vehicle, which deflects the vehicle toward the central section of the road.

To suppress such a yaw moment generated due to a left-and-right braking force difference, a driver needs to steer in a direction opposite to the direction in which the vehicle is deflected. Such control is known as countersteering. However, countersteering requires a certain level of skill.

Japanese Laid-Open Patent Publication No. 2001-334947 discloses a system that suppresses yaw moment generated due to a left-and-right braking force difference. Specifically, the system, based on the difference between rotation speeds of the left and right wheels, controls a steering mechanism to add a controlled steered angle to the wheel with the smaller rotation speed.

However, since the system according said publication causes difference in rotation speeds of wheels and generated moment to vary due to the antiskid control, it is sometimes difficult to effectively stabilize the vehicle attitude.

SUMMARY OF THE INVENTION

Accordingly, it is an objective of the present invention to provide a steering control apparatus for vehicle and method for steering control, which apparatus and method are capable of preventing the vehicle driving on a μ-split road from being deflected toward a side of higher friction coefficient due to a left-and-right braking force difference when the braking is applied.

To achieve the above-mentioned objective, the present invention provides a steering control apparatus for a vehicle. The vehicle has left and right wheels to which braking force is applied, a steering section, and a steered wheel that is steered by steering of the steering section. The apparatus includes a steering control amount calculating section that calculates a steering control amount based on the steering amount of the steering section. A braking force difference control amount calculating section estimates the difference between braking force applied to the left wheel and braking force applied to the right wheel, and calculates a braking force difference control amount according to the braking force difference to cancel yaw moment that acts on the vehicle due to the braking force difference. A vehicle state control amount calculating section calculates a target yaw rate and a target yaw angle based on a vehicle state quantity, calculates a yaw rate feedback amount based on the deviation between the target yaw rate and an actual yaw rate, calculates a yaw angle feedback amount based on the deviation between the target yaw angle and an actual yaw angle, adds the yaw rate feedback amount to the yaw angle feedback amount, and calculates a vehicle state control amount based on the result of the addition. An adding section adds the braking force difference control amount and the vehicle state control amount to the steering control amount. A steered amount controlling section determines a steered amount by which the steered wheel is steered based on the addition result of the adding section. According to a change in a vehicle speed or to time elapsed from when braking started to be applied to the left and right wheels, an adjusting section adjusts a ratio related to the braking force difference control amount to be added to the steering control amount, and a ratio related to the vehicle state control amount to be added to the steering control amount.

Another aspect of the present invention, a steering control apparatus including a steered torque control amount calculating section that calculates a steered torque control amount based on steering torque of the steering section is provided. A braking force difference control amount calculating section estimates the difference between braking force applied to the left wheel and braking force applied to the right wheel, and calculates a braking force difference control amount according to the braking force difference to cancel yaw moment that acts on the vehicle due to the braking force difference. A correction amount calculating section calculates a correction amount related to the steered torque control amount according to the braking force difference, thereby canceling the yaw moment. A first adding section adds the braking force difference control amount to the steering control amount. A second adding section adds the correction amount to the steered torque control amount. A steered amount controlling section determines a steered amount by which the steered wheel is steered based on the addition result of the first adding section. A steered torque controlling section determines steered torque to be applied to the steered wheel based on the addition result of the second adding section.

Another aspect of the present invention, a steering control method for a vehicle is provided. The method includes calculating a steering control amount based on the steering amount of the steering section; estimating the difference between braking force applied to the left wheel and braking force applied to the right wheel. The method further includes calculating a braking force difference control amount according to the braking force difference to cancel yaw moment that acts on the vehicle due to the braking force difference. A target yaw rate and a target yaw angle are calculated based on a vehicle state quantity. A yaw rate feedback amount is calculated based on the deviation between the target yaw rate and an actual yaw rate. A yaw angle feedback amount is calculated based on the deviation between the target yaw angle and an actual yaw angle. A vehicle state control amount is calculated based on the yaw rate feedback amount and the yaw angle feedback amount. A steered amount by which the steered wheel is steered is obtained based on the braking force difference control amount, the vehicle state control amount, and the steering control amount. The method changes the magnitude of the braking force difference control amount and the magnitude of the vehicle state control amount according to a vehicle speed or to time elapsed from when braking started to be applied to the left and right wheels.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Embodiments of the present invention will now be described with reference to the drawings. In the following embodiments, the present invention is applied to an electric power steering control apparatus of a vehicle such as an automobile. The apparatus will be referred to as steering control apparatus.

Hereinafter, a first embodiment of the present invention will be described with reference to FIGS. 1 to 12.

(1) Hardware Configuration of Steering Control Apparatus 20

Figure 1:
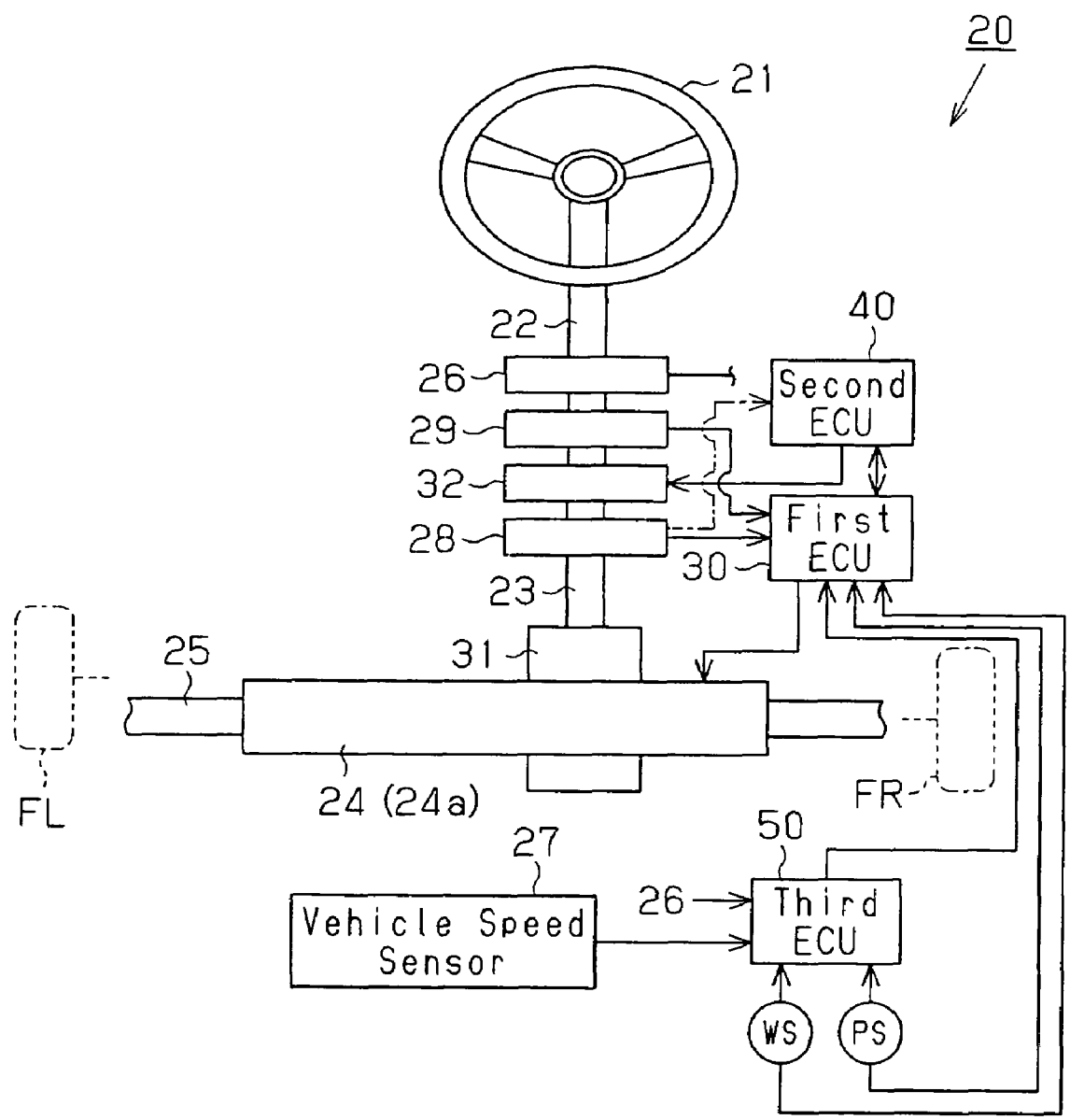
FIG. 1 is a diagrammatic view illustrating a steering control apparatus 20 according to a first embodiment of the present invention.

As shown in FIG. 1, a steering control apparatus 20 includes a steering wheel 21, a first steering shaft 22, a second steering shaft 23, a rod 25, a steering angle sensor 26, an output angle sensor 28, a steering torque sensor 29, an IFS actuator 32. One end of the first steering shaft 22 is coupled to the steering wheel 21. The other end of the first steering shaft 22 is coupled to the input side of the IFS actuator 32. IFS is an abbreviation for intelligent front steering.

The IFS actuator 32 includes an electric motor 32a (see FIG. 4) and a speed reducer (not shown). The output side of the IFS actuator 32 is coupled to one end of the second steering shaft 23. The other end of the second steering shaft 23 is coupled to the input side of a steering gear box 31. The steering gear box 31 uses a rack and pinion (not shown) to convert rotation inputted by the second steering shaft 23 into axial movement of the rod 25, to which steered wheels FR, FL (front wheels) are attached.

A rotation angle of the first steering shaft 22 (steering angle) is detected by the steering angle sensor 26. A rotation angle of the second steering shaft 23 (output angle) is detected by the output angle sensor 28. The detected angles are sent to a third ECU 50 and an EPSECU (hereinafter referred to as a first ECU 30) as a steering angle signal and an output angle signal, respectively.

Variable gear ratio section, which varies a gear ratio by using an electric motor located in a steering transmission system coupling the steering wheel 21 and the steered wheels FR, FL will be referred to as a variable gear ratio system.

In this configuration, the electric motor 32a and the speed reducer (not shown) of the IFS actuator 32 varies the ratio of the output gear to the input gear according to a vehicle speed V in real time, thereby varying the ratio of the output angle of the second steering shaft 23 to the steering angle of the first steering shaft 22. That is, the steering angle signal from the steering angle sensor 26 and a vehicle speed signal from a vehicle speed sensor 27, which will be described below, are sent to the third ECU 50 and a second ECU 40 through a communication bus, which will be described below. Then, the second ECU 40 determines an ACT angle command value θ0c using a motor rotation angle map (not shown). The ACT angle command value θ0c corresponds to a target rotation angle of the electric motor 32a of the IFS actuator 32, which is determined uniquely by the steering angle and the vehicle speed V. The second ECU 40 supplies a motor voltage that corresponds to the determined ACT angle command value θ0c to a motor drive circuit AC2 (see FIG. 4) through amplifying section. The ACT angle command value θ0c corresponds to a steering control amount that is computed based on the steering angle (steering amount).

Accordingly, the steering gear ratio corresponding to the vehicle speed V is set such that the output angle of the IFS actuator 32 is great relative to the steering angle of the steering wheel 21 when the vehicle is not moving or moving at a low speed, and that the output angle of the IFS actuator is small relative to the steering angle of the steering wheel 21 when the vehicle is moving at a high speed. Since the steered amount of the steered wheels FR, FL, that is, the steered angle of the steered wheels, is proportionate to the output angle of the IFS actuator 32, the steered amount (steered angle) of the steered wheels FR, FL is controlled by controlling the output angle.

As a result, for example, since the steering gear ratio at the IFS actuator 32 is reduced when the vehicle is not moving or moving at a low speed, even a small steering angle of the steering wheel 21 can steer the steered wheels FR, FL by a great amount, which permits the driver to steer easily. Since the steering ratio at the IFS actuator 32 is increased when the vehicle is moving at a high speed, even a large steering angle of the steering wheel 21 steers the steered wheels by a small amount, and the stability of the behavior of the vehicle is maintained.

An EPS actuator 24 includes a motor 24a, which is coaxial with the rod 25. The EPS actuator 24 functions as a steering actuator that is controlled by the first ECU 30 to generate assist force according to the steering state, thereby assisting steering. The motor 24a is a brushless DC motor.

That is, the steering control apparatus 20 has a function to vary the steering gear ratio according to the vehicle speed V with the IFS actuator 32 through a variable gear ratio control executed by the second ECU 40. The steering control apparatus 20 also functions to assist steering by generating assist force corresponding to the steering state with the EPS actuator 24 through steering control executed by the first ECU 30.

Figure 4:
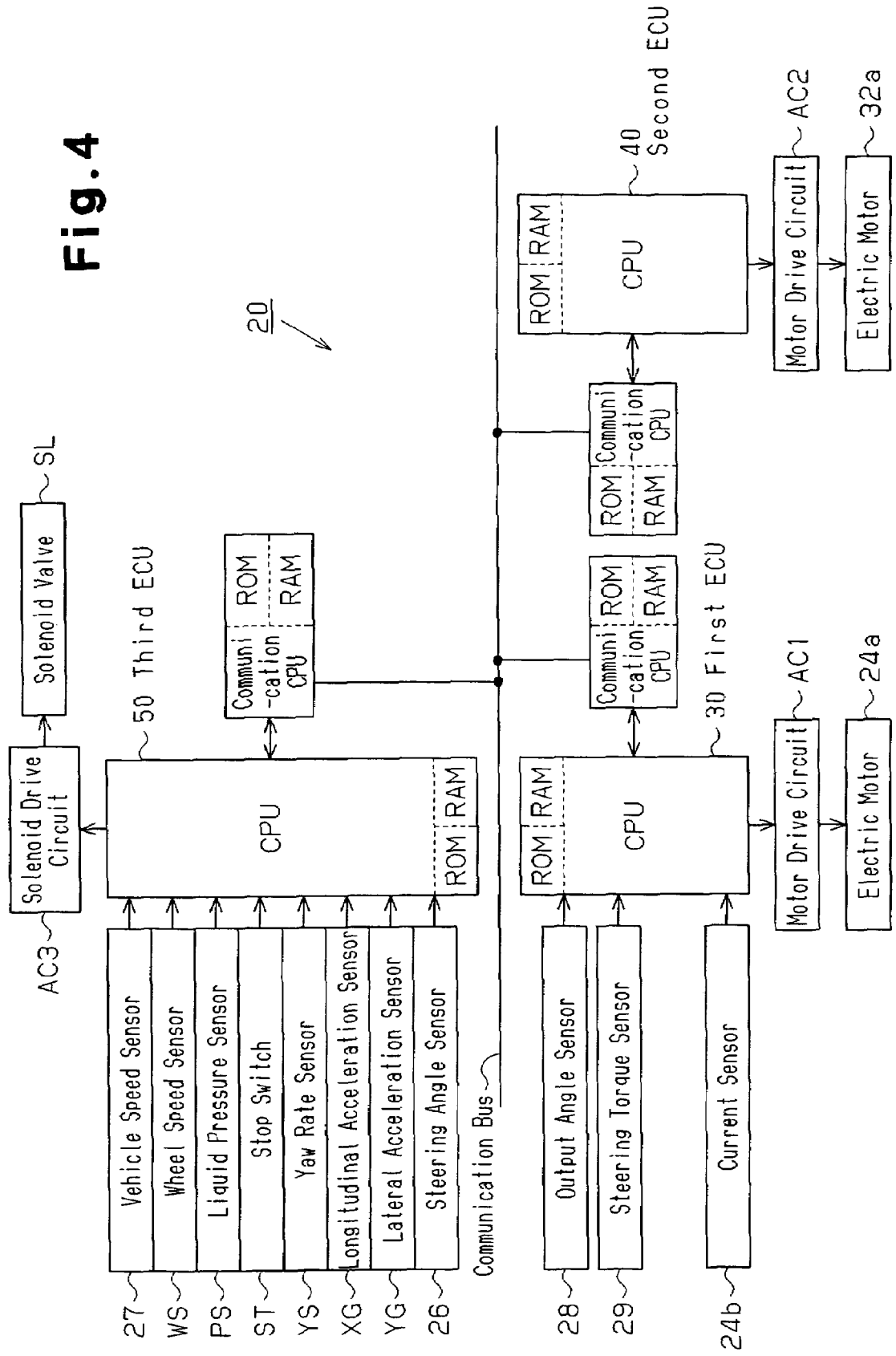
FIG. 4 is an electrical block diagram showing the steering control apparatus 20 according to the embodiment shown in FIG. 1.

(2) Electric Configuration of Steering Control Apparatus 20 and Peripheral Devices FIG. 4 illustrates the configuration of the system according to the present embodiment. As shown in FIG. 4, the ECUs of systems such as the control system of the steering control apparatus 20 and a brake control system are connected to each other through a communication bus, so that system information is shared among the systems.

(3) Electric Configuration of Control System of Steering Control Apparatus 20

The control system of the steering control apparatus 20 includes a first ECU 30 and a second ECU 40. The first ECU 30 is an electric steering control unit having a CPU, ROM, and RAM. The second ECU 40 is used for variable gear ratio control and has a CPU, ROM, and RAM.

The first ECU 30 is connected to the output angle sensor 28, the steering torque sensor 29, and a current sensor 24b. The output angle sensor 28, which is shown in FIG. 1, detects the rotation angle of the second steering shaft 23, that is, the output angle of the IFS actuator 32, and sends an output angle signal to the first ECU 30. The steering torque sensor 29 detects steering torque acting on the first steering shaft 22, and sends a steering torque signal to the first ECU 30. Although not illustrated in FIG. 1, the current sensor 24b, which detects motor current through the motor 24a, sends a motor current signal of the detected current to the first ECU 30 as shown in FIG. 4.

In this manner, the first ECU 30 receives signals representing the output angle, the steering torque, and the motor current. The first ECU 30 also receives the steering angle and the vehicle speed V through the communication bus from the third ECU 50. Accordingly, the first ECU 30 computes an assist current command value, which permits the motor 24a to generate assist force in accordance with the steering state, the vehicle speed V, and the motor current. The first ECU 30 then adds various current command values, which will be discussed below, to the computed assist current command value, and outputs the resultant to a motor drive circuit AC1 (see FIG. 4), thereby controlling the motor 24a.

As described above, through the variable gear ratio control, the second ECU 40 determines a target rotation angle of the electric motor 32a of the IFS actuator 32, which target rotation angle is determined uniquely by the steering angle and the vehicle speed V, using the motor rotation angle map (not shown). The second ECU 40 supplies a motor voltage that corresponds to the determined ACT angle command value θ0c according to the target rotation angle to the motor drive circuit AC2 (see FIG. 4) through the amplifying section.

(4) Electric Configuration of Brake Control System

On the other hand, the brake control system includes a brake control unit ECU (hereinafter, referred to as a third ECU 50), which includes a CPU, ROM, and RAM for brake control. The third ECU 50 is connected to a wheel speed sensor WS, a liquid pressure sensor PS, a stop switch ST, a yaw rate sensor YS, a longitudinal acceleration sensor XG, and a lateral acceleration sensor YG. The third ECU 50 is connected to the steering angle sensor 26 and the vehicle speed sensor 27. The steering angle sensor 26, which is shown in FIG. 1, detects the rotation angle of the first steering shaft 22, that is, the steering angle inputted to the IFS actuator 32, and sends a steering angle signal to the third ECU 50 as shown in FIG. 4. Further, the vehicle speed sensor 27, which is shown in FIG. 1, sends the vehicle speed signal representing the detected vehicle speed V to the third ECU 50 as shown in FIG. 4. The wheel speed sensor WS, the liquid pressure sensor PS, the stop switch ST, the yaw rate sensor YS, the longitudinal acceleration sensor XG, and the lateral acceleration sensor YG each sends a detection signal to the third ECU 50. WS is used on behalf of WS1 to WS4. PS is used on behalf of PS1 to PS6. Thus, the wheel speed sensors WS1 to WS4 detect the wheel speed of steered wheels FR and FL (front wheels), and rear wheels RR and RL respectively, and output the detection signals to the third ECU 50.

Solenoid valves SL1 to SL8 (in FIG. 4, SL is used as a representative) are connected to the third ECU 50 through a solenoid drive circuit AC3. The first ECU 30, the second ECU 40, and the third ECU 50 of the control system of the steering control apparatus 20 are each connected to the communication bus through a communication unit having a CPU, ROM, and RAM for communication to be constituted so that mutual system information can be shared between respective systems, that is, shared between the first ECU 30, the second ECU 40, and the third ECU 50. In the brake control system, varieties of information, such as information on a braking force which each wheel FR, FL, RR, or RL generates is obtained. Also, various types of control such as anti skid control (ABS), traction control (TRC), and vehicle stability control (VSC) is executed on the basis of these by the brake control system. Various kinds of information necessary for the control system of the steering control apparatus 20 can be also transmitted from the brake control system.

(5) Brake Fluid Pressure Control Apparatus

Figure 5:
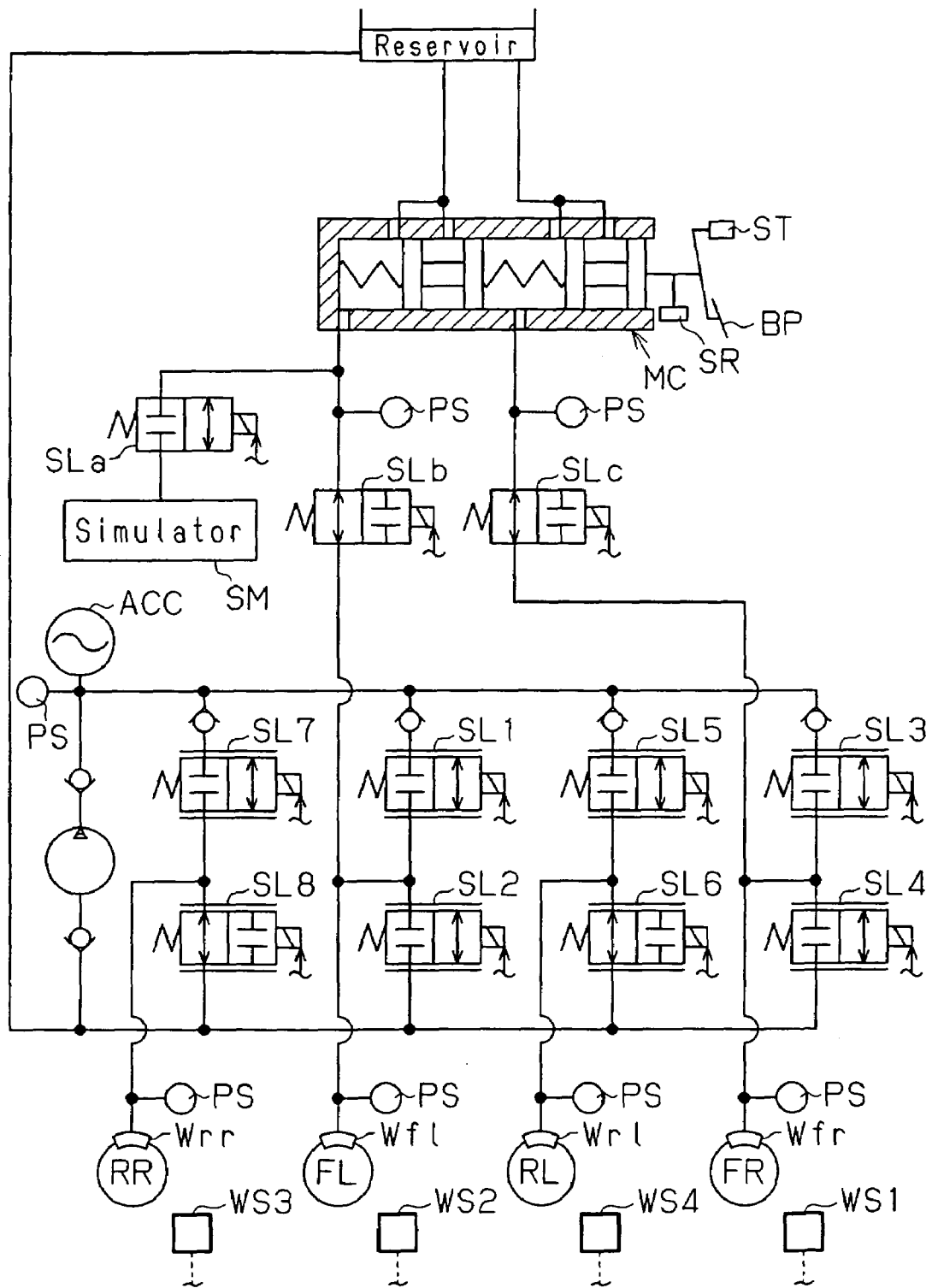
FIG. 5 is a structural diagram showing the brake fluid pressure control apparatus according to the embodiment shown in FIG. 1.

The mechanical constitution of the brake fluid pressure control apparatus, which constitutes the brake control system will be explained with reference to FIG. 5. FIG. 5 is a structural diagram showing the brake fluid pressure control apparatus.

FIG. 5 shows an example of the brake fluid pressure control apparatus in this embodiment, and has the constitution called a "brake-by-wire". Since this is described, for example, in Japanese Laid-Open Patent Publication No. 2000-62597, its operation will be explained briefly. A hydraulic circuit of a master cylinder MC and wheel cylinders Wfr, Wfl, Wrr, and Wrl is separated at the time of normal operation. When a brake pedal BP is depressed, a driver's braking request is detected by a brake pedal travel sensor SR, a tread force sensor, a master cylinder fluid pressure sensor, etc. Then, a target braking force of each wheel is determined on the basis of the detected variables, and the braking hydraulic pressure of each wheel FR, FL, RR, or RL is controlled by the corresponding linear solenoid valve (SL1 to SL8).

At the time of braking, solenoid valves SLa, SLb, and SLc of an ON/OFF type are excited, and the solenoid valve SLa moves to an open position and the solenoid valves SLb and SLc moved to closed positions. Thus, the master cylinder MC is separated from the wheel cylinders Wfr, Wfl, Wrr, and Wrl, and communicates with a stroke simulator SM through the solenoid valve SLa. The brake fluid pressure of each wheel FR, FL, RR, or RL is independently controlled by controlling a linear solenoid valve (for example, SL1) in an accumulator side, and a linear solenoid valve (for example, SL2) in a reservoir side by making a high-pressure accumulator ACC a pressure source. In addition, the hydraulic circuit constitution in FIG. 5 is an example, and the present invention is not limited to this, but the constitution is sufficient only that the constitution is a hydraulic circuit constitution where each wheel cylinder Wfr, Wfl, Wrr, or Wrl can be automatically pressurized.

Instead of using the solenoid valves SL1 to SL8, the fluid pressure of the wheel cylinders Wfr, Wfl, Wrr, and Wrl may be controlled with linear valves (not shown). The braking force generating section may be a constitution of giving the braking torque mechanically by a motor etc. (not shown) without using brake fluid pressure.

(6) Control Block

Figure 2:
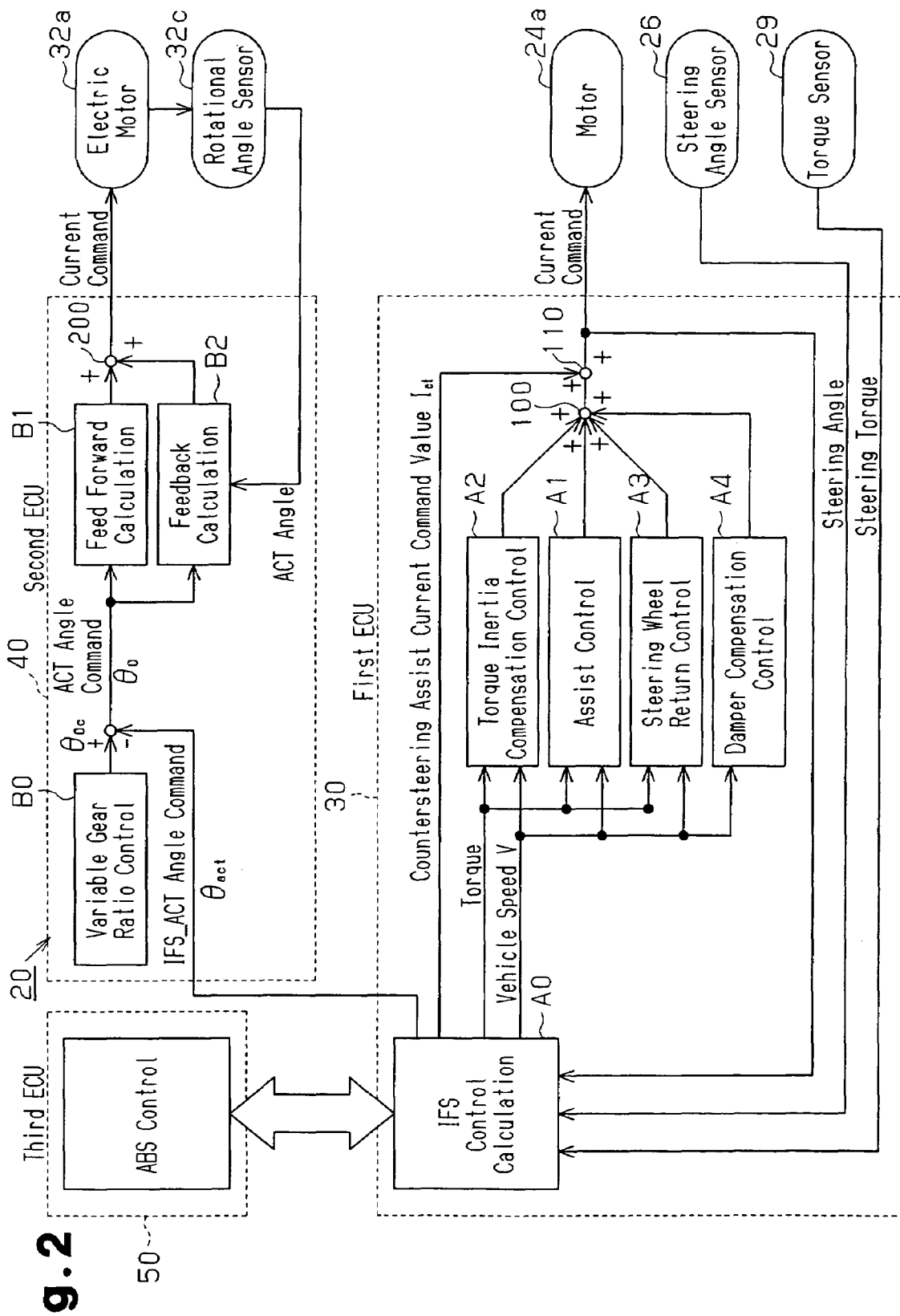
FIG. 2 is a control block diagram showing the steering control apparatus 20 shown in FIG. 1.

The control blocks of the first ECU 30 and the second ECU 40 will now be described with reference to FIG. 2. FIG. 2 shows the control blocks of the steering control apparatus 20.

(6-1) Control Blocks of First ECU 30

In FIG. 2, an IFS control calculation described later is performed in a block A0 of the first ECU 30, and also a countersteering assist current command value Ict and an IFS_ACT angle command value θact are calculated. On the basis of the steering torque and the vehicle speed signal, well-known assist control, torque inertia compensation control, steering wheel return control, and damper compensation control calculation are executed in blocks A1 to A4, thereby an assist current command value, a torque inertia compensating current command value, a steering wheel return current command value, and a damper compensation current command value are determined respectively.

The torque assistance, which reduces an operating force of the steering wheel 21 applied by a driver is performed with the assist current command value calculated by the block A1. The assist current command value corresponds to the steered torque control amount. Control for compensating for the response delay due to the inertia of the motor 24*a* is performed using the torque inertia compensating current command value calculated by the block A2. Control is performed with the steering wheel return current command value calculated by the block A3, so that the return to the neutral position of the steering wheel 21 is improved. Control is performed with the damper compensation current command value calculated by the block A4, so that the converging property of the steering wheel 21 is improved by suppressing the excessive return of the steering wheel 21. Respective current command values calculated by the blocks A1 to A4 are added up in an adder 100, and the resultant becomes an EPS current command value. Further, the countersteering assist current command value Ict from the block A0 is added to the EPS current command value by an adder 110, and the resultant is sent to the motor drive circuit AC1 (see FIG. 4) to control the motor 24*a*. That is, the motor 24*a* outputs steered torque that corresponds to the sum of the countersteering assist current command value Ict and the EPS current command value. Then, the steered wheels FR, FL are steered by the outputted steered torque.

(6-2) Control Blocks of Second ECU 40

In FIG. 2, a block B0 of the second ECU 40 determines an ACT angle command value θ0c corresponding to the target rotation angle of the electric motor 32*a* of the IFS actuator 32, which target rotation angle is uniquely determined corresponding to the steering angle and the vehicle speed V by variable gear ratio control process, using the motor rotation angle map (not shown).

The IFS_ACT angle command value θact inputted from the block A0 of the first ECU 30 is added to the ACT angle command value θ0c. The block B1 sets the resultant as a new ACT angle command value θ0, and performs feedforward calculation on the basis of the ACT angle command value θ0, and calculates a feedforward current command value. On the other hand, a block B2 calculates a feedback current command value by performing feedback calculation on the basis of the ACT angle command value θ0. Thus, a rotation angle of the electric motor 32*a* is detected by the rotation angle sensor 32*c* provided in the electric motor 32*a*, and is outputted to the second ECU 40 as an ACT angle signal. Therefore, a closed loop constituted accordingly makes the feedback control of the electric motor 32*a* by the block B2 possible.

An adder 200 adds the feedback current command value to the feedforward current command value. The resultant is inputted into the motor drive circuit AC2 (refer to FIG. 4), and, thereby, the electric motor 32*a* is controlled.

(6-3) Control Blocks of IFS Control Calculation

Next, with reference to FIG. 3, the control blocks of IFS control calculation performed by the first ECU 30 will be explained.

A block C1 is an estimation block of the left-and-right braking force difference. That is, the block C1 estimates a braking force given to each wheel of a vehicle, and estimates (calculates) the difference between braking forces given to the right and left wheels on the basis of the estimated braking forces. The left-and-right braking force difference is the difference between braking forces given to wheels in a left-hand side of a vehicle, and braking forces given to wheels in a right-hand side. The sum of the braking forces given to front and rear wheels in the left-hand side or the braking force given to a front wheel in the left-hand side is used as the former. The sum of the braking forces given to front and rear wheels in the right-hand side, or a braking force given to the front wheel in the right-hand side is used as the latter. In a description and drawings, the left-and-right braking force difference may be simply referred to as braking force difference for convenience of explanation.

In the block C1, for example, with detection signals of fluid pressure sensor PS and the wheel speed sensor WS, which are provided in each wheel, specifically, with a brake fluid pressure (that is, braking hydraulic pressure) signal and a wheel speed signal, the braking force generated in each wheel is estimated, and the braking force difference between right and left wheels is calculated. Since specific means relating to the estimation of a braking force is described in, for example, Japanese Laid-Open Patent Publication No. 2000-108863, explanation is omitted.

A block C2 is a driver steering state calculation block that performs driver steering state calculation. That is, in the block C2, on the basis of the steering angle signal from the steering angle sensor 26 and the steering speed, which is a steering angular velocity computed based on the steering angle signal, the current steering state of the steering wheel 21 is determined. Specifically, it is determined whether the steering wheel 21 is being turned to the right, being returned from the right, turned to the left, or returned from the left.

A block C3 is a control ratio calculation block. When there is a left-and-right braking force difference in the block C1, a braking force difference control ratio α1 and a vehicle state quantity FB ratio α2 are computed in the block C3. FB is an abbreviation for feedback.

A block C4 is a calculation block of the countersteering assist current command value Ict. In the block C4, a countersteering assist torque τct is computed based on the braking force difference. The computed countersteering assist torque τct is multiplied by the braking force difference control ratio α1 (that is, a correction factor), so that the correction calculation of the control amount is performed. In the block C4, on the basis of the result of the correction calculation of the computed control amount, the countersteering assist current command value Ict is calculated. The countersteering assist current command value Ict corresponds to a correcting variable of the steered torque control amount.

A block C5 is a calculation block of an active countersteering ACT commanded angle. In the block C5, the active countersteering ACT commanded angle is calculated based on the braking force difference. Hereinafter, the active countersteering ACT commanded angle may be referred to as braking force difference control amount θ1.

A block C6 is a block in which IFS_ACT angle command value θact is calculated. In the block C6, the braking force difference control amount θ1 is multiplied by the braking force difference control ratio α1, which is a correction factor. That is, correction calculation of the braking force difference control amount θ1 is performed (see equation (1)). As a result, a braking force difference control amount θ2 is obtained.

$$\theta 2 = \theta 1 \times \alpha 1 \tag{1}$$

In the block C6, a driver steering state correction factor β ($0<\beta\leq1$), which corresponds to a driver steering state (discussed below), is calculated. The braking force difference control amount θ2 is multiplied by the driver steering state correction factor β. That is, correction calculation according to the driver steering state quantity (see the equation (2)) is performed. As a result, a braking force difference control amount θ3 is obtained.

$$\theta 3 = \theta 2 \times \beta \tag{2}$$

Calculation for obtaining the driver steering state correction factor β will be described below.

Further, in the block C6, a vehicle state quantity FB control amount θ, which will be discussed below, is multiplied by the vehicle speed amount FB ratio α2 (see the equation (3)). As a result, a vehicle state quantity FB control amount θa is obtained.

$$\theta a = \theta \times \alpha 2 \tag{3}$$

Further, in the block C6, the obtained braking force difference control amount θ3 is added to the vehicle state quantity FB control amount θa (see the equation (4)) to obtain the IFS_ACT angle command value θact.

$$\begin{aligned}\theta act &= \theta 3 + \theta a \\ &= ((\theta 1 \times \alpha 1) \times \beta) + (\theta \times \alpha 2)\end{aligned} \tag{4}$$

In this embodiment, the vehicle state quantity includes the vehicle speed V, the yaw angle, the yaw rate, the slip angle, and the steered angle of the vehicle. A block D1 is a block of vehicle state quantity estimation (calculation), and obtains a target yaw rate γt and a target slip angle St on the basis of the vehicle speed V and the actual steered angle. The actual steered angle is calculated by the first ECU 30 on the basis of the output angle signal, which is detected and outputted by the output angle sensor 28. Since specific calculation methods of the target yaw rate γt of the vehicle and the target slip angle St of the vehicle are disclosed in Japanese Laid-Open Patent Publication No. 2002-254964, explanation is omitted.

A block D2 is a block of yaw rate FB calculation and slip angle FB calculation. In the block D2, a proportional gain computing unit D2a, a differentiator D2b, a derivative gain computing unit D2c, and a gain computing unit D2d are provided. A deviation (hereinafter, this is referred to as a yaw rate deviation) between the target yaw rate γt inputted from the block D1, and the actual yaw rate which is detected by the yaw rate sensor YS and is inputted through the third ECU 50, is inputted to the proportional gain computing unit D2a. Then, a control amount θp, which is a proportional term of feedback control of the yaw rate, is calculated by multiplying the yaw rate deviation by the yaw rate P gain. The control amount θp is outputted to an adder 70. The yaw rate detected by the yaw rate sensor YS corresponds to the actual yaw rate.

The yaw rate deviation is differentiated in the differentiator D2b. The control amount θd which is a derivative term of feedback control of the yaw rate is calculated by multiplying the differentiated yaw rate deviation by the yaw rate D gain in the derivative gain computing unit D2c. The control amount θd is outputted to the adder 70. The sum of the control amount θp, which is the proportional term of feedback control of the yaw rate, and the control amount θd, which is the derivative term, is equivalent to the yaw rate feedback amount.

In the gain computing unit D2d, a slip angle deviation between the target slip angle St and the vehicle slip angle calculated by a well-known method by the third ECU 50 is inputted. Then, the slip angle gain is multiplied by the slip angle deviation, and a control amount θs of the slip angle FB is calculated. The control amount θs is outputted to the adder 70.

A block D3 is a block of yaw angle FB calculation, and includes a block D3a and a block D3b. The block D3a is a block of target yaw angle calculation, and calculates a target yaw angle by integrating the target yaw rate γt. The block D3b is a block of yaw angle calculation, and calculates a yaw angle, that is, an actual yaw angle by integrating the yaw rate. In a gain computing unit D3c, the yaw angle gain is multiplied by the deviation between the target yaw angle and the yaw angle, so that a control amount θy of the yaw angle FB is calculated. The control amount θy is outputted to the adder 70. The control amount θy of the yaw angle FB is equivalent to the yaw angle feedback amount. The various kinds of gains are values determined on the basis of the structural characteristics of the vehicle and the steering control apparatus 20, and are obtained by test in advance.

The adder 70 calculates the vehicle state quantity FB control amount θ by adding respective control amounts inputted. Thus, θ=θp+θd+θy+θs is calculated and is outputted to the block 6.

(7) Operation of First Embodiment

Figure 6:
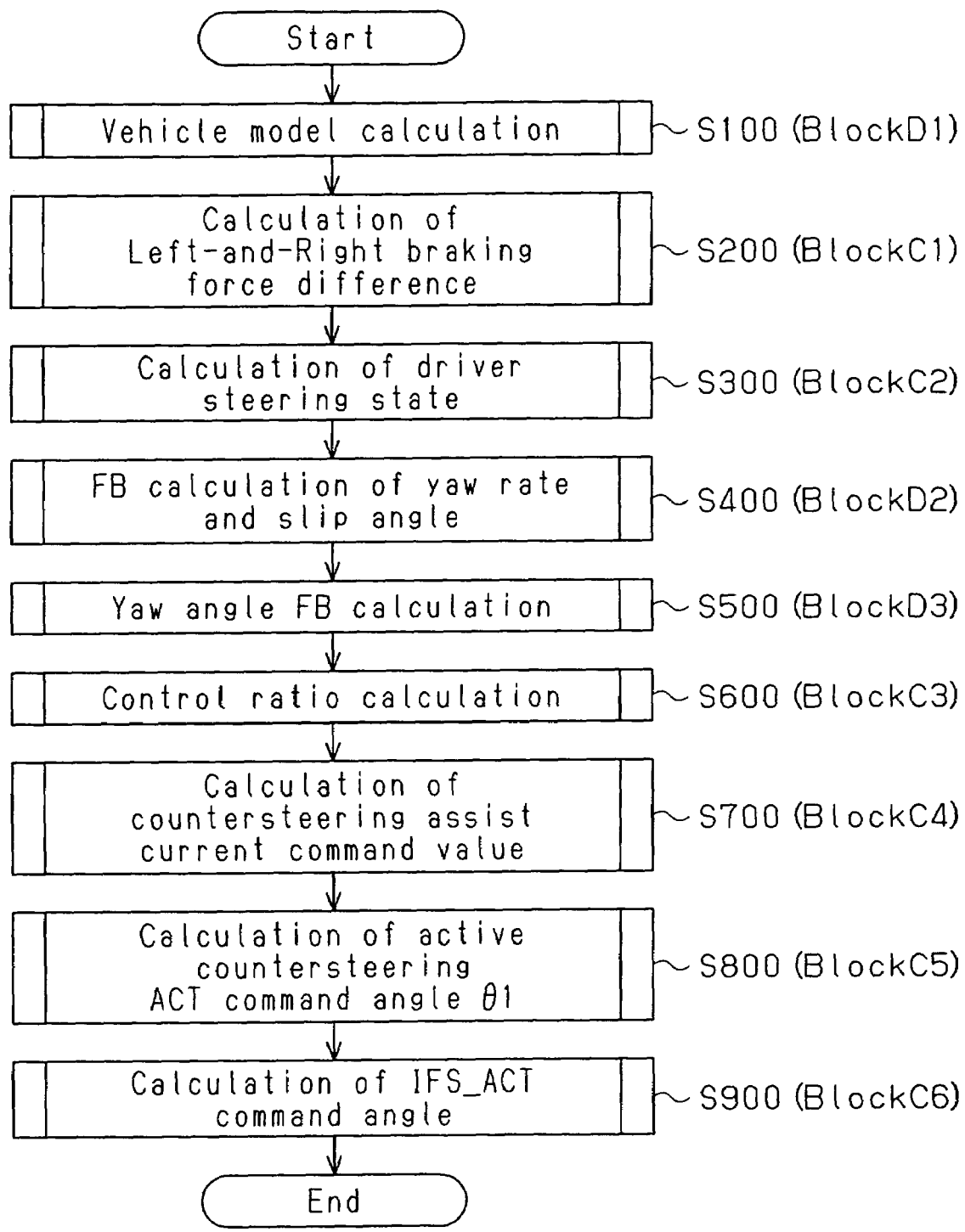
FIG. 6 is a flowchart showing an IFS control calculation program executed by an IFSCPU of the first ECU 30 of the steering control apparatus 20 according to the embodiment shown in FIG. 1.

Now, the operation of the steering control apparatus 20 constituted as mentioned above will be explained with reference to FIGS. 6 to 12. FIG. 6 is a flowchart of an IFS control calculation program, which is executed by a CPU (IFSCPU) of the first ECU 30 at a predetermined cycle.

(S100: Vehicle Model Calculation: Block D1)

At S100, a vehicle model calculation is performed on the basis of the vehicle speed V and the actual steered angle, and the target yaw rate γt and the target slip angle St are obtained.

(S200: Calculation of Left-and-Right Braking Force Difference: Block C1)

At S200, the calculation of the left-and-right braking force difference is performed. That is, with detection signals (specifically, a brake fluid pressure signal and a wheel speed signal) of the fluid pressure sensor PS and the wheel speed sensor WS, which are provided in each vehicle wheel, the braking force generated in each vehicle wheel is estimated according to the equation of motion on the each vehicle wheel, and the braking force difference between right and left wheels is calculated.

(S300: Driver Steering State Calculation: Block C2)

Figure 7:
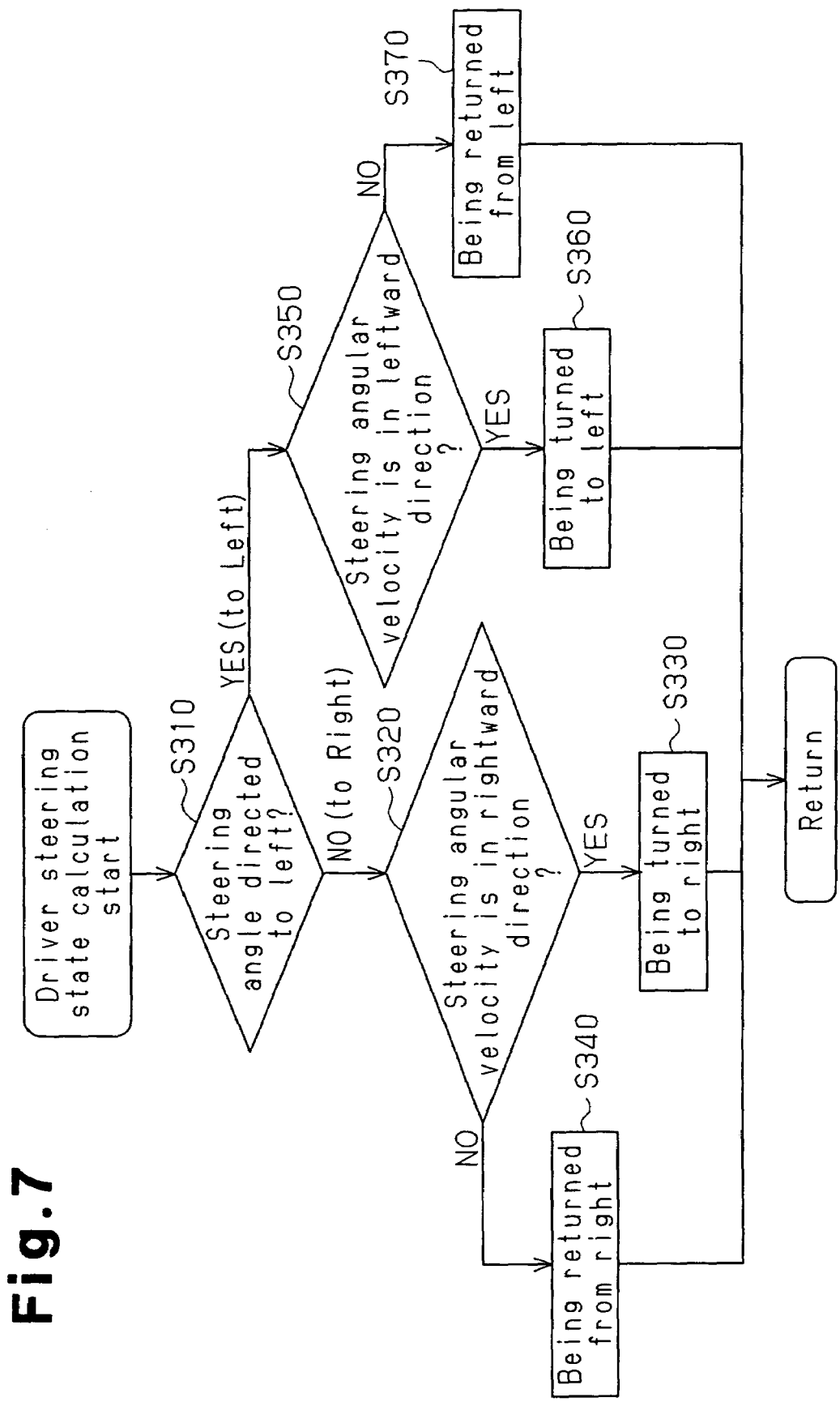
FIG. 7 is a flowchart showing a routine for calculating the steering state of a driver according to the embodiment shown in FIG. 1.

At S300, the driver steering state calculation is performed. FIG. 7 is a flowchart showing the driver steering state calculation. At S310, whether the steering angle is directed to the left is judged. The judgment of whether the steering angle is directed to the left is performed based on whether the steering angle has a positive value or a negative value. In this embodiment, with reference to a neutral state, the steering angle has a positive value if the steering angle is on the left side. Also, the steering angle has a negative value if the steering angle is on the right side. If the steering angle is in the right side (negative) at S310, the outcome is "NO". Then, at S320, whether the steering angular velocity is in the rightward direction is judged. When the steering angular velocity has a negative value, the outcome is "YES", and the steering wheel 21 is judged to be currently turned to the right (S330). When the steering angular velocity has a positive value at S320, the outcome is "NO", and the steering wheel 21 is judged to be currently returned from the right (S340).

On the other hand, if the steering angle is in the left side (positive) at S310, the outcome is "YES". Then, at S350, whether the steering angular velocity is in the leftward direction is judged. When the steering angular velocity has a positive value, the outcome is "YES", and the steering wheel 21 is judged to be currently turned to the left (S360). When the steering angular velocity has a negative value at S350, the outcome is "NO", and the steering wheel 21 is judged to be currently returned from the left (S370).

(S400: Yaw Rate FB Calculation and Slip Angle FB Calculation: Block D2)

At S400, the yaw rate FB calculation and the slip angle FB calculation are performed. In the yaw rate FB calculation, the control amount θp and the control amount θd of the yaw rate FB are obtained on the basis of the target yaw rate γt and the actual yaw rate. In the slip angle FB calculation, the control amount θs of the slip angle FB is obtained on the basis of the target slip angle St and the actual slip angle.

(S500: Yaw Angle FB calculation: Block D3)

Yaw angle FB calculation is performed at S500. That is, on the basis of the target yaw rate γt and the actual yaw rate, the control amount θy of the yaw angle FB is obtained.

(S600: Calculation of Control Ratio: Block C3)

Figure 8:
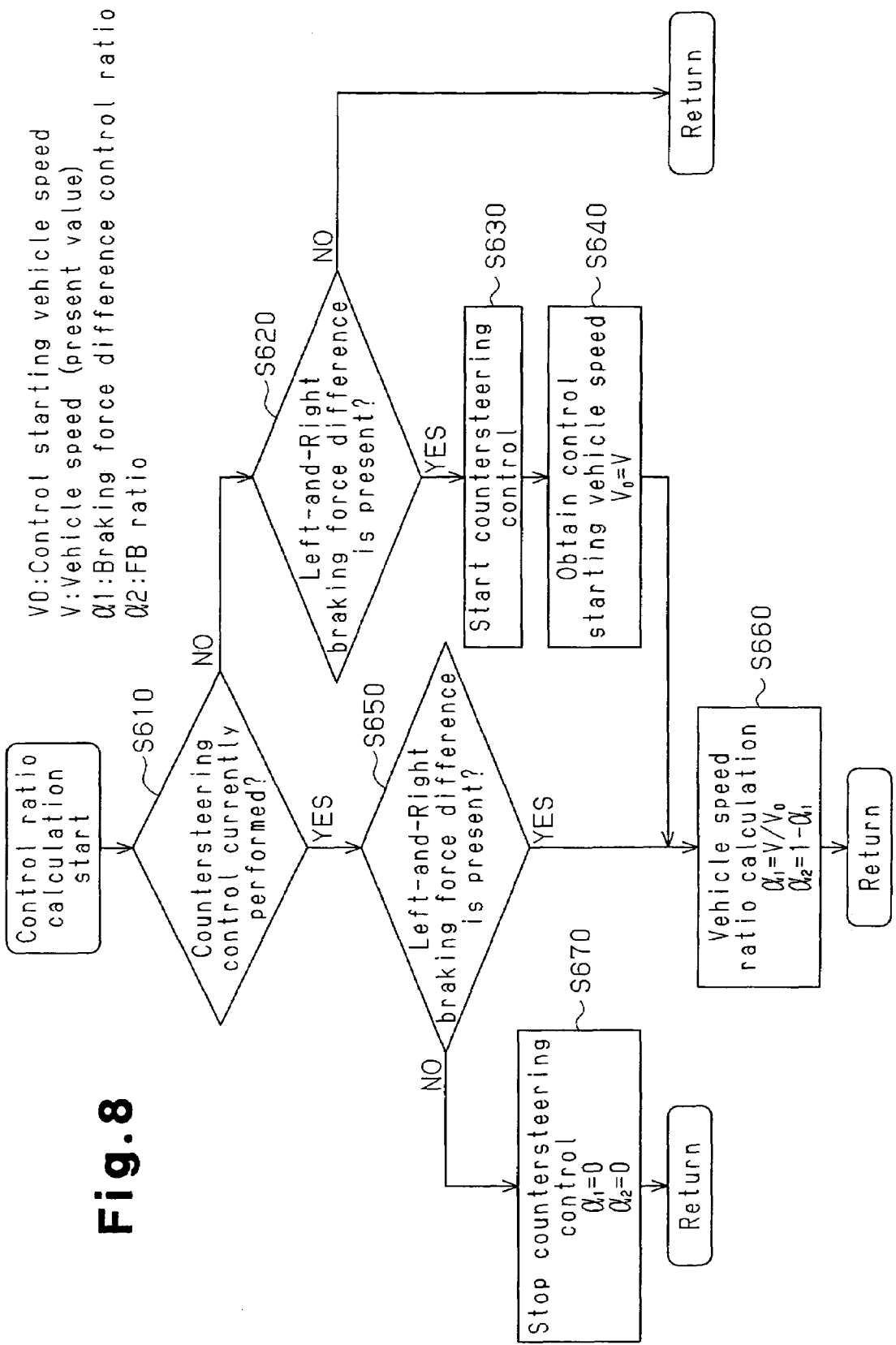
FIG. 8 is a flowchart showing a routine for calculating a control ratio according to the embodiment shown in FIG. 1.

At S600, the calculation of the control ratio is performed. FIG. 8 is a flowchart of the control ratio calculation. At S610, whether the countersteering assist control is currently performed is judged. Whether the countersteering control is currently performed is judged on the basis of a judgment flag, which is set or reset at S630 or S670. The judgment flag, which will be discussed below, represents the countersteering control is being performed. If the judgment flag is not set, it is judged that the countersteering control is not currently performed, and the process moves to S620. If the judgment flag is set, it is judged that the countersteering control is currently performed, and the process moves to step S650.

At first, since the judgment flag is not set, the outcome of S610 is "NO", and whether there is the braking force difference is present is judged at S620. If the braking force difference obtained at the above described S200 is not less than a predetermined value, it is judged that the braking force difference is present and the process moves to S630. If the braking force difference is less than the predetermined value, it is judged that there is no braking force difference. In this case, the control ratio calculation is ended. Since the braking force difference is present at S630, the judgment flag representing that the countersteering control is currently performed is set, and the process moves to S640. At S640, a control starting vehicle speed V0 is obtained. Specifically, the vehicle speed in the current control cycle is used as the control starting vehicle speed V0. Then, the process moves to S660.

At S660, a vehicle speed ratio calculation is performed. In this case, the vehicle speed ratio includes the braking force difference control ratio α1 and the vehicle state quantity FB ratio α2. The braking force difference control ratio α1 is calculated using the equation (5), and the vehicle state quantity FB ratio α2 is calculated using the equation (6).

$$\alpha 1 = V/V0 \tag{5}$$

$$\alpha 2 = 1 - \alpha 1 \tag{6}$$

After calculating the control ratios, the first ECU 30 ends the control ratio calculation.

In the control cycle where the control start vehicle speed V0 is obtained, the braking force difference control ratio α1 is calculated as 1, and the vehicle state quantity FB ratio α2 is calculated as 0.

If the judgment flag is set at S610, it is judged that the countersteering control is currently performed. In this case, at S650, whether there is a left-and-right braking force difference is present is judged. If the braking force difference obtained at the above described S200 is not less than a predetermined value, it is judged that the braking force difference is present and the process moves to S660. If the braking force difference is less than the predetermined value, it is judged that there is no braking force difference and the process moves to S670. At S660, the vehicle speed ratio calculation is performed. At S670, the judgment flag is reset, and the countersteering control is stopped (OFF). Also, the braking force difference control ratio al and the vehicle state quantity FB ratio $\alpha 2$ are set to 0. Then, the control ratio calculation is ended.

Therefore, during the countersteering control, although the braking force difference control ratio $\alpha 1$ is 1 at first, when the vehicle speed V is lowered in the subsequent control cycle, the braking force difference control ratio $\alpha 1$ has a value less than 1. On the other hand, during the countersteering control, although the vehicle state quantity FB ratio $\alpha 2$ is 0 at first, when the vehicle speed V is lowered in the subsequent control cycle, the vehicle state quantity FB ratio $\alpha 2$ has a value greater than 0. In this manner, as the vehicle speed V is lowered, the braking force difference control ratio $\alpha 1$ is made greater, that is, the braking force difference control amount $\theta 2$ (=$\theta 1 \times \alpha 1$) is made greater (stronger) at the initial stage of the countersteering control. When the countersteering control is ended, the vehicle state quantity FB ratio $\alpha 2$ is made greater than the first value (0), so that the vehicle state quantity FB control amount $\theta a$ (=$\theta \times \alpha 2$) becomes greater (stronger).

(S700: Calculation of Countersteering Assist Current Command Value: Block C4)

Figure 9:
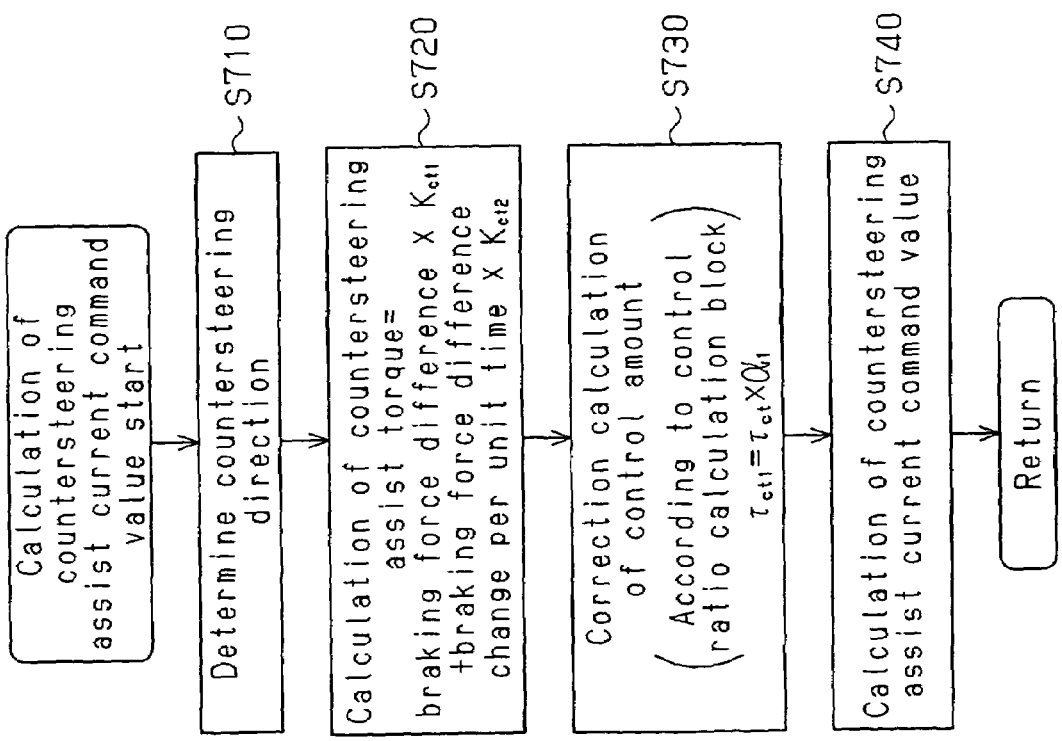
FIG. 9 is a flowchart showing a routine for calculating a command value of a countersteering assist current according to the embodiment shown in FIG. 1.

At S700, the calculation of the countersteering assist current command value is performed. FIG. 9 is a flowchart of the calculation of the countersteering assist current command value. At S710, the countersteering direction is judged. Specifically, on the basis of the braking force at each wheel computed at S200, the direction in which the countersteering should be applied is judged. That is, when the braking force of the wheels in the right-hand side is greater than the braking force of the wheels in the left-hand side, it is judged that countersteering in the left turning direction is necessary. When the braking force of the wheels in the left-hand side is greater than the braking force of the wheels in the right-hand side, it is judged that countersteering in the right turning direction is necessary.

Next, at S720, calculation of countersteering assist torque is performed. That is, the time differentiation calculation of the braking force difference, which is obtained at S200, is performed to calculate a braking force difference change per unit time. On the basis of the calculated braking force difference change per unit time and the braking force difference, torque required for countersteering assist (countersteering assist torque $\tau ct$) is calculated according to the equation (7) shown below.

$$\tau ct=(\text{braking force difference})\times Kct1+(\text{braking force difference change per unit time})\times Kct2 \quad (7)$$

Kct1 represents a countersteering assist torque calculation conversion proportional gain. Kct2 represents a countersteering assist torque calculation conversion differentiation gain. These gains are constants that are determined through experiments in advance. As obvious from the equation (7), the countersteering assist torque $\tau ct$ is increased as the braking force difference is increased.

At S730, calculation for correcting the control amount of the countersteering assist torque $\tau Ct$ calculated at S720. Specifically, the calculation is performed according to the equation (8) shown below.

$$\tau ct1=\tau ct\times \alpha 1 \text{ ($\alpha 1$ is the braking force difference control ratio)} \quad (8)$$

$\tau ct1$ is a corrected value and represents a countersteering assist torque after being corrected.

At S740, on the basis of the corrected countersteering assist torque $\tau ct1$, a current command value corresponding to the torque $\tau ct1$, that is, a countersteering assist current command value Ict is calculated.

This countersteering assist current command value Ict is added to the EPS current command value at the adder 110 (see FIG. 2), and the motor 24a is controlled, accordingly. That is, since torque is increased in a direction along which countersteering needs to be applied, the steered wheels FR, FL are steered in the countersteering direction according to the braking force difference. Therefore, even if the driver is not capable of appropriately applying countersteering, the driver can easily apply countersteering.

(S800: Active Countersteering ACT Commanded Angle ($\theta 1$) Calculation: Block C5)

Figure 10:
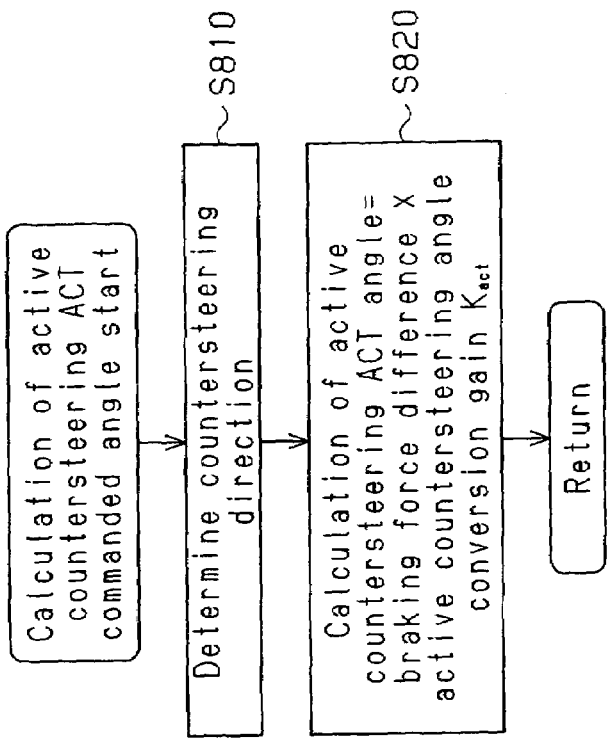
FIG. 10 is a flowchart showing a routine for calculating a commanded angle of an active countersteering ACT according to the embodiment shown in FIG. 1.

Active countersteering ACT commanded angle calculation is performed at S800. FIG. 10 is a flowchart of the active countersteering ACT commanded angle calculation.

At S810, the countersteering direction is judged as at S710. At S820, a braking force difference control amount $\theta 1$, which is active countersteering ACT commanded angle, is calculated according to the equation (9) shown below.

$$\theta 1=(\text{braking force difference})\times Kact \quad (9)$$

Kact represents an active countersteering angle conversion gain, which is a constant is obtained through experiments in advance. As obvious from the equation (9), the braking force difference control amount $\theta 1$ is increased as the braking force difference is increased. The braking force difference control amount $\theta 1$ corresponds to an active countersteering angle.

(S300: IFS_ACT Commanded angle Calculation: Block C6)

Figure 11:
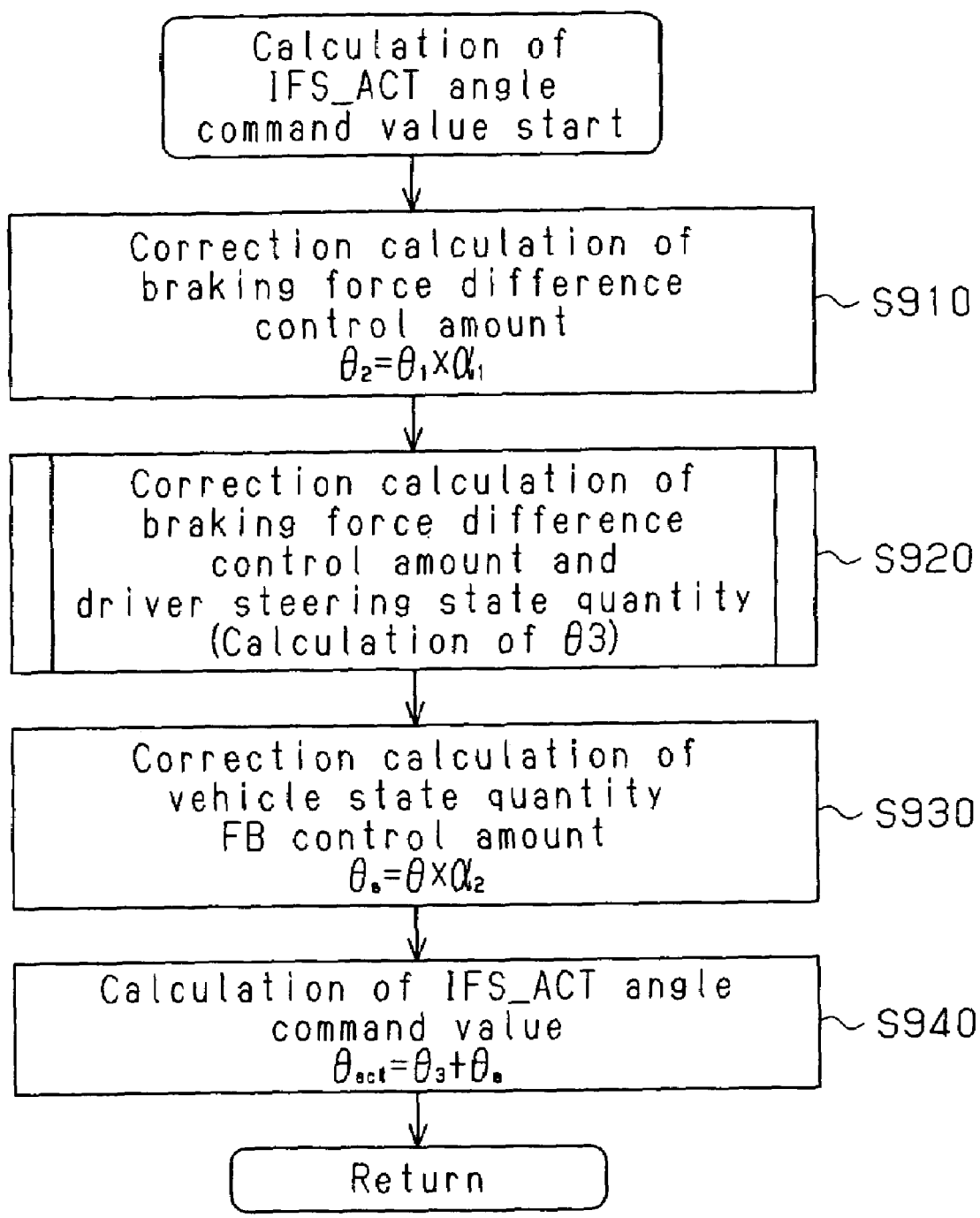
FIG. 11 is a flowchart showing a routine for calculating a commanded angle of an IFS-ACT according to the embodiment shown in FIG. 1.

As shown in FIG. 6, the IFS_ACT commanded angle is calculated at S900. FIG. 11 is a flowchart of the IFS_ACT commanded angle calculation.

At S910, the calculation for correcting the braking force difference control amount is performed. That is, the braking force difference control amount $\theta 2$ is obtained using the aforementioned equation (1).

$$\theta 2=\theta 1\times \alpha 1 \quad (1)$$

The braking force difference control amount $\theta 2$ corresponds to an active countersteering angle after being corrected.

Figure 12:
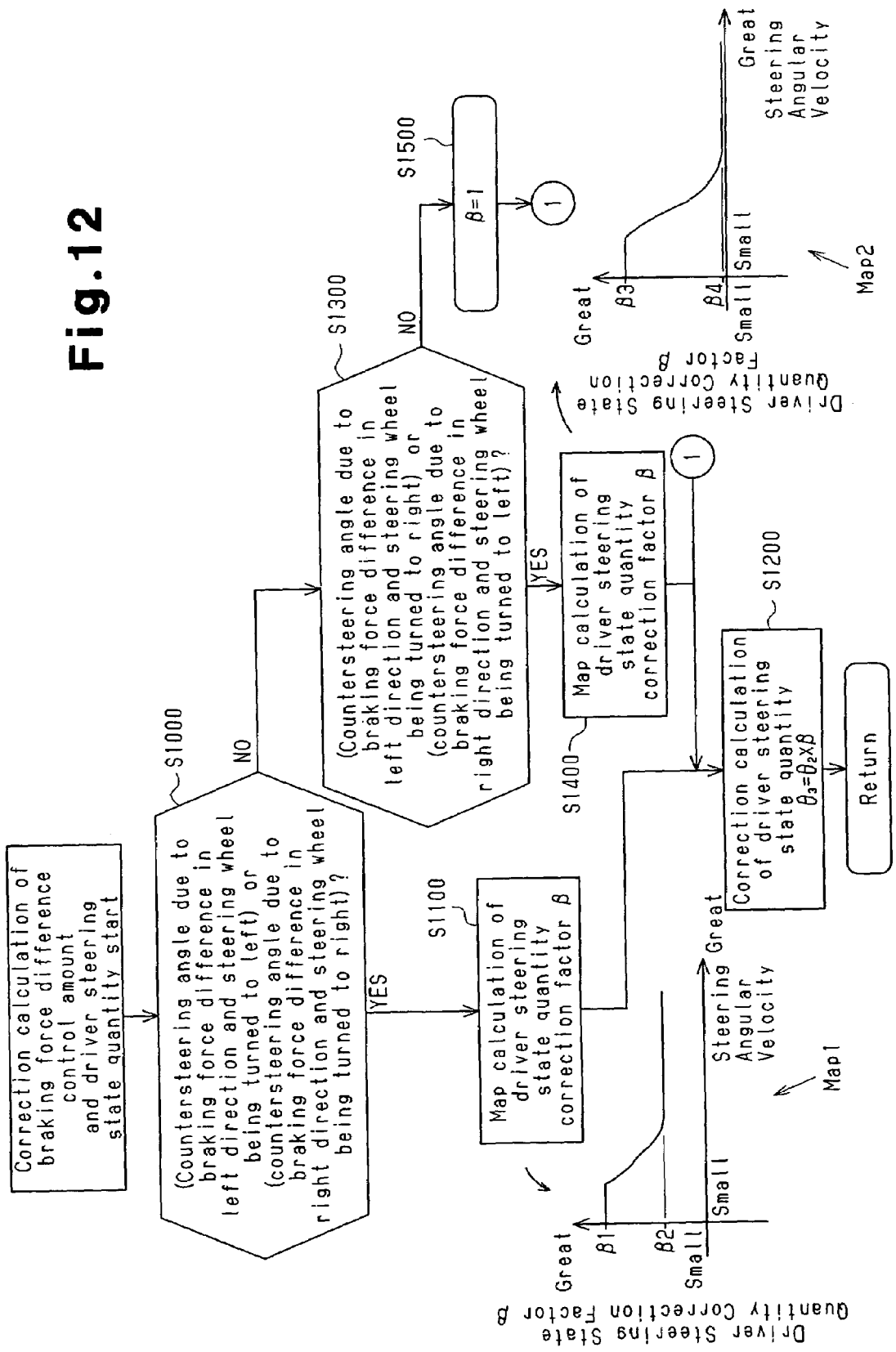
FIG. 12 is a flowchart showing a routine of calculation of a braking force difference control amount and calculation for correcting a driver steering state quantity according to the embodiment shown in FIG. 1.

At S920, with respect to the braking force difference control amount $\theta 2$, correction calculation is performed according to the driver steering state quantity. FIG. 12 is a flowchart of the correction calculation.

At S1000, whether any one of the following requirement 1 and 2 is satisfied is judged.

(Requirement 1)

The braking force difference control amount $\theta 2$, which is the active countersteering angle determined based on the braking force difference, is in the left direction, and the steering wheel 21 is being turned to the left.

(Requirement 2)

The braking force difference control amount θ2 is in the right direction, and the steering wheel 21 is being turned to the right.

Each of the requirements 1 and 2 represents that the direction of the countersteering by the steering control apparatus 20 coincides with the steering direction of the driver (direction of the countersteering). When one of the requirements 1 and 2 is satisfied, it is judged that the countersteering is applied in a direction canceling yaw moment due to a left-and-right braking force difference. In this case, the process moves to S1100, at which the driver steering state correction factor β is calculated using the Map1. The Map1 is shown in FIG. 12. The horizontal axis of the Map1 represents the steering speed (steering angle speed), and the vertical axis represents the driver steering state correction factor β. In a range of small steering speeds in the Map1, the driver steering state correction factor β has a relatively great constant value β1. When the steering speed is not less than a predetermined value, the correction factor β has a relatively small constant value β2 (β2<β1).

After the driver steering state correction factor β is calculated at S1100, a driver steering state correction amount is calculated at S1200. That is, the braking force difference control amount θ3 is obtained using the equation (2).

$$\theta 3 = \theta 2 \times \beta \quad (2)$$

At S1000, if neither the requirement 1 nor 2 is satisfied, the process moves to S1300. At step 1300, whether any one of the following requirements 3 and 4 is satisfied is judged.

(Requirement 3)

The braking force difference control amount θ2, which is the active countersteering angle determined based on the braking force difference, is in the left direction, and the steering wheel 21 is being turned to the right.

(Requirement 4)

The braking force difference control amount θ2 is in the right direction, and the steering wheel 21 is being turned to the left.

For purposes of illustration, the active countersteering angle is simply referred to as countersteering angle in FIG. 12.

Each of the requirements 3 and 4 represents that the direction of the countersteering by the steering control apparatus 20 does not coincide with the steering direction of the driver.

Neither the requirements 3 nor 4 is satisfied, the driver steering state correction factor β is set to 1 at S1500. Then, the process moves to S1200.

When one of the requirements 3 and 4 is satisfied, it is judged that the driver is steering in a direction opposite to the direction canceling yaw moment due to a left-and-right braking force difference. In this case, the process moves to S1400, at which the driver steering state correction factor β is calculated using the Map2. The Map2 is shown in FIG. 12. The horizontal axis of the Map2 represents the steering speed (steering angle speed), and the vertical axis represents the driver steering state correction factor β. In a range of small steering speeds in the Map2, the driver steering state correction factor β has a relatively great constant value β3. When the steering speed is not less than a predetermined value, the correction factor has a relatively small constant value β4 (β4<β3). In this embodiment, β4 is smaller than the β2.

After the driver steering state correction factor β is calculated at S1400, the process moves to S1200. At S1200, a driver steering state correction amount calculation, that is, the calculation of the braking force difference control amount θ3 is performed.

As shown in FIG. 11, the vehicle state quantity FB control amount correction calculation is performed at S930. That is, the following equation is calculated to obtain the vehicle state quantity FB control amount θa.

$$\theta a = \theta \times \alpha 2 \quad (3)$$

At S940, the IFS_ACT angle command value θact is calculated using the following equation (4).

$$\theta act = \theta 3 + \theta a \quad (4)$$
$$= (\theta 2 \times \beta) + \theta a$$
$$= ((\theta 1 \times \alpha 1) \times \beta) + (\theta \times \alpha 2)$$

The IFS_ACT angle command value θact computed in the above described manner is sent to the second ECU 40 as shown in FIG. 2.

Since the vehicle state quantity FB ratio θ2 is zero when the vehicle speed V is equal to the control starting vehicle speed V0, the IFS_ACT angle command value θact is equal to θ3 according to the equation (4). Since an inequality α1>α2 is satisfied when the vehicle speed V is high, the priority of the braking force difference control amount θ3 is greater than that of the vehicle state quantity FB control amount θa compared to a case where the vehicle sipped V is low. As vehicle speed V is reduced, the braking force difference control amount θ3 in the IFS_ACT angle command value θact is reduced accordingly compared to the case where the vehicle speed V is high. To the contrary, the priority of the vehicle state quantity FB control amount θa is increased.

When the driver is applying countersteering in a direction canceling yaw moment due to a left-and-right braking force difference, the driver steering state correction factor β computed at S1100 has a value in a range between β1 and β2, inclusive. That is, when the steering angular speed is low, the correction factor β is β1. When the steering angular speed is great, the correction factor β is β2 (β2<β1). Therefore, when the driver is applying countersteering in a direction canceling yaw moment due to a left-and-right braking force difference, if the steering angular velocity is increased, the braking force difference control amount θ3 is less than that of the case where the steering angular velocity is small. When the steering angular velocity by the countersteering of the driver is great, the control based on the braking force difference control amount θ3 might interfere with the countersteering of the driver. However, in this embodiment, when the steering angular velocity by the countersteering of the driver is great, the braking force difference control amount θ3 is reduced, thereby a control level of the deflection of the vehicle is prevented from being excessive. Accordingly, the behavior of the vehicle is optimized.

When the driver is turning the steering wheel 21 in a direction opposite to the direction canceling yaw moment due to a left-and-right braking force difference, the driver steering state correction factor β computed at S1400 has a value in a range between β3 and β4, inclusive. That is, when the steering angular speed is low, the correction factor β is β3. When the steering angular speed is great, the correction factor β is β4 (β4<β3). Therefore, when the driver is turning the steering wheel 21 in a direction opposite to the direction canceling yaw moment due to a left-and-right braking force difference, if the steering angular velocity is increased, the braking force difference control amount θ3 is less than that of the case where the steering angular velocity is small. That is, since the β4 has a value close to 0 if the steering angular velocity is great, the control of the vehicle behavior is restrained while giving a higher priority to the driver's intension.

The preferred embodiment provides the following advantages.

(1) The steering control apparatus 20 according to the present embodiment includes the second ECU 40 (steering control amount calculating section), which calculates the ACT angle command value θ0c (steering control amount) based on the steering angle of the steering wheel 21 (steering section). The first ECU 30 of the steering control apparatus 20 functions as braking force difference control amount calculating section, which estimates the difference between the braking forces applied to the left wheels and the right wheels and calculates the braking force difference control amount θ3 to cancel yaw moment due to the left-and-right braking force difference according to the braking force difference between the left wheels and the right wheels. In addition, the second ECU 40 of the steering control apparatus 20 functions as first adding section, which adds the braking force difference control amount θ3 to the ACT angle command value θ0c. The second ECU 40 functions as steering amount control section, which determines the output angle based on the braking force difference control amount θ3 and the ACT angle command value θ0c, thereby controlling the steered angle (steered amount) of the steered wheels FR, FL.

As a result, if the brake is applied when the vehicle is driving on a μ-split road, the vehicle is prevented from being deflected toward to a side of higher friction coefficient regardless of whether the driver is applying countersteering or even if the driver panics and holds the steering section.

(2) In the present embodiment, the first ECU 30 of the steering control apparatus 20 functions as steered torque control amount calculating section, which calculates EPS current command values including the assist current command value (steered torque control amount) based on the steering torque of the steering wheel 21 (steering section). The first ECU 30 functions as corrected steered angle torque control amount calculating means, which calculates the countersteering assist current command value (Ict: corrected steered torque control amount) that corresponds to the braking force difference in a direction canceling yaw moment due to the left-and-right braking force difference. That is, the first ECU 30 functions as a correction amount calculating section and calculates a correction amount (Ict) related to the steered torque control amount. The first ECU 30 also functions as second adding section, which adds the countersteering assist current command value Ict (correcting variable of the steered torque control amount) to the assist current command value (steered torque control amount).

The first ECU 30 functions as the steered torque control section, which, when yaw moment is produced due to braking force difference, controls the steered torque of the steered wheels FR, FL based on the value obtained by adding the countersteering assist current command value Ict (correcting variable of the steered torque control amount) to the EPS current command value, which includes the assist current command value (steered torque control amount).

As a result, since torque is added in a direction along which countersteering needs to be applied when the yaw moment due to braking force difference is produced, the steered wheels FR, FL are steered in the countersteering direction according to the braking force difference. Therefore, even if the driver is not capable of appropriately applying countersteering, the driver can easily apply countersteering. That is, if the brake is applied when the vehicle is driving on a μ-split road, the driver is encouraged to apply countersteering if yaw moment due to a left-and-right braking force difference is produced. Accordingly, the vehicle is prevented from being deflected.

(3) The first ECU 30 (vehicle state quantity feedback control amount calculating section, that is, vehicle state control amount calculating section) of the steering control apparatus 20 according to the present embodiment calculates the yaw rate feedback amount (θp+θd: yaw rate feedback amount) based on the difference between the actual yaw rate and the target yaw rate γt, which is calculated based on the vehicle state quantity including the vehicle speed V and the actual steered angle (output angle). The first ECU 30 calculates the yaw angle feedback amount θy based on the difference between the actual yaw angle and the target yaw angle calculated based on the vehicle state quantity. The first ECU 30 then calculates the vehicle state quantity FB control amount (vehicle state control amount) θa based on the sum of the feedback amounts. In addition, the second ECU 40 of the steering control apparatus 20 functions as the first adding section, which adds the braking force difference control amount θ3 and the vehicle state quantity FB control amount θa to the ACT angle command value θ0c (steering control amount). The second ECU 40 functions as the steered amount control section, which controls the output angle by adding the braking force difference control amount θ3 and the vehicle state quantity FB control amount θa to the ACT angle command value θ0c, thereby controlling the steered angle (steered amount) of the steered wheels FR, FL.

As a result, since the output angle contains the added vehicle state quantity FB control amount θa, unstable behavior of the vehicle that is not caused by braking is suppressed. Also, the vehicle is prevented from being deflected to the higher μ-split side due to a left-and-right braking force difference.

(4) The first ECU 30 of the steering control apparatus 20 according to the present embodiment functions as adjusting section and adjusts the ratio (α1) of the braking force difference control amount θ3 and the ratio (α2) of the vehicle state quantity FB control amount θa to be added to the ACT angle command value θ0c according to a change of the vehicle speed V. When the vehicle speed V is great, the first ECU 30 increases the braking force difference control amount θ3 compared to the case where the vehicle speed V is slow, and decreases the vehicle state quantity FB control amount θa.

On the other hand, when the vehicle speed V is slow, the first ECU 30 decreases the braking force difference control amount θ3 compared to the case where the vehicle speed V is great, and increases the vehicle state quantity FB control amount θa. Thus, when the vehicle speed V is great, the added braking force difference control amount θ3 is more than that of the case where the vehicle speed V is slow. Therefore, the vehicle is prevented from being deflected toward a side of a higher friction coefficient (higher μ) due to a left-and-right braking force difference. When the vehicle speed V is slow, the first ECU 30 decreases the braking force difference control amount θ3 compared to the case where the vehicle speed V is great, and increases the vehicle state quantity FB control amount θa. This prevents unstable behavior of the vehicle that is not caused by braking.

(5) The first ECU 30 of the steering control apparatus 20 according to the present embodiment functions as the correcting variable of the steered torque control amount calculating section, which calculates the countersteering assist current command value Ict (correcting variable of the steered torque control amount) such that the current command value changes in accordance with the vehicle speed V.

In this case, if yaw moment due to braking force difference is produced in the vehicle, the first ECU 30 (steered torque control section) adds the countersteering assist current command value Ict (correcting variable of the steered torque control amount), which corresponds to the vehicle speed V, to the assist current command value (steered torque control amount), thereby controlling the steered torque. As a result, the driver is encouraged to apply countersteering in accordance with the vehicle speed V. Accordingly, deflection of the vehicle is easily prevented.

(6) The first ECU 30 (the steering state detecting section) of the steering control apparatus 20 according to the present embodiment detects the steering state of the driver based on the steering angular velocity (steering speed) of the steering wheel 21. When the driver turns the steering wheel 21 in a direction canceling yaw moment due to a left-and-right braking force difference, the first ECU 30 (the braking force difference control amount calculating section) decreases the braking force difference control amount θ3 according to the steering angular velocity. That is, when the steering angular velocity is great, the braking force difference control amount θ3 is controlled to be less than that in the case where the steering angular velocity is small. As a result, the control level of the deflection of the vehicle is prevented from being excessive by the interference between the driver and the steering control apparatus 20. Accordingly, the behavior of the vehicle is optimized.

(7) The first ECU 30 (the steering state detecting section) of the steering control apparatus 20 according to the present embodiment detects the steering state of the driver based on the steering angular velocity (steering speed) of the steering wheel 21. When the driver turns the steering wheel 21 in a direction opposite to the direction canceling yaw moment due to a left-and-right braking force difference, the first ECU 30 (the braking force difference control amount calculating section) decreases the braking force difference control amount θ3.

As a result, when the driver intends to turn the vehicle in a direction opposite to the direction canceling the moment due to a left-and-right braking force difference, the intention of the driver is given a higher priority.

Figure 13:
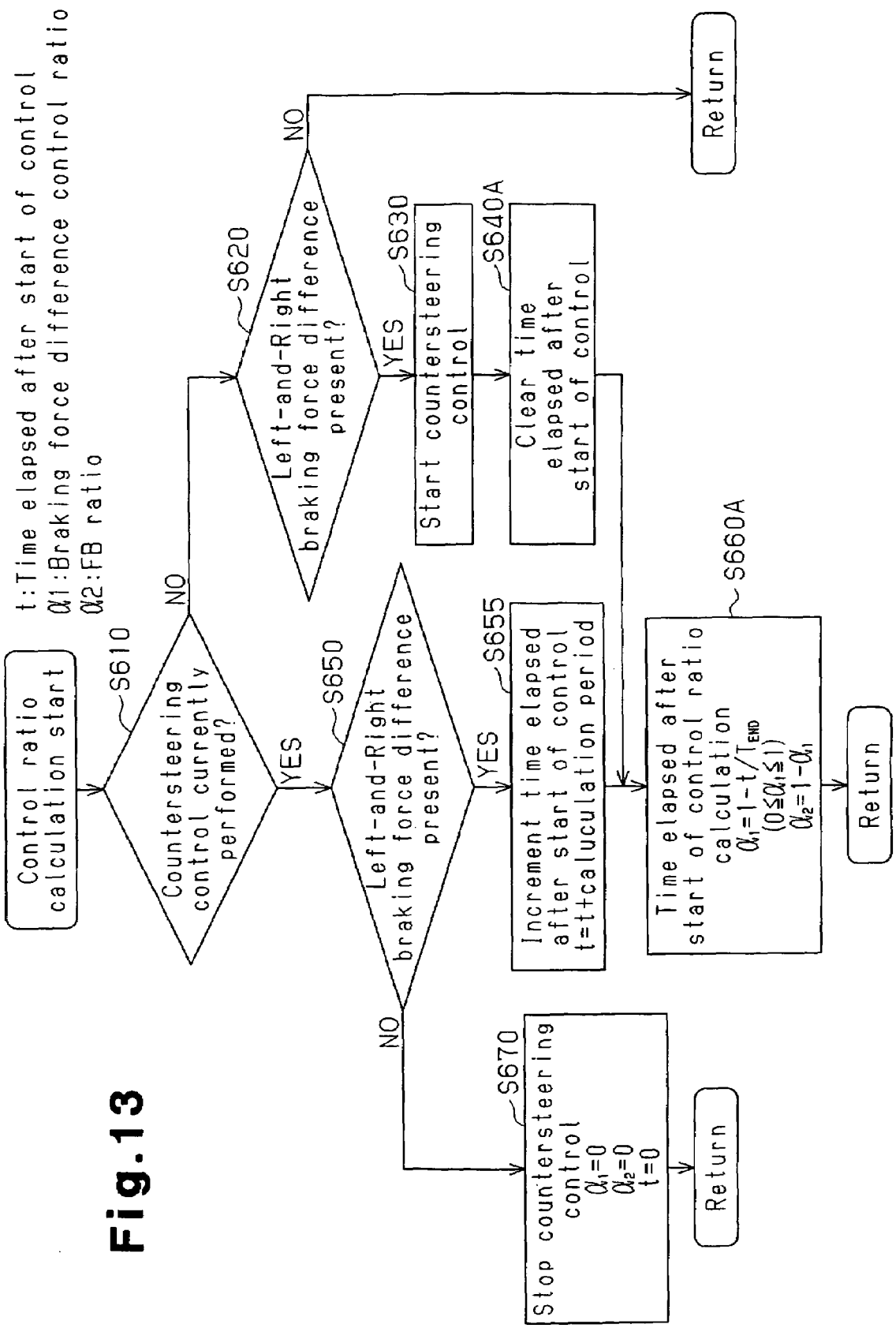
FIG. 13 is a flowchart showing a routine for calculating control ratio according to a second embodiment of the present invention.

A second embodiment of the present invention will now be described with reference to FIG. 13. Since the hardware configuration of the second embodiment is the same as that of the first embodiment, the description thereof is omitted.

The second embodiment is different from the first embodiment in some steps of the control ratio ($\alpha 1$, $\alpha 2$) calculation of S600. Other control calculations of the second embodiment are the same as those of the first embodiment. Hereinafter, the control ratio calculation of the second embodiment will be described.

(S600: Calculation of Control Ratio: Block C3)

Since S610 to S630, S650, and S670 are the same as those in the first embodiment, the description thereof is omitted. When moving to S640A from S630, the CPU (IFSCPU) of the first ECU 30 clears an elapsed time t (timer) after starting the control to 0, and proceeds to S660A. At S660A, starting time ratio calculation is performed. The starting time ratio includes the braking force difference control ratio $\alpha 1$ and the vehicle state quantity FB ratio $\alpha 2$. The braking force difference control ratio $\alpha 1$ is calculated using the equation (10), and the vehicle state quantity FB ratio $\alpha 2$ is calculated using the equation (11).

$$\alpha 1 = 1 - t/T_{END} \tag{10}$$

$$(0 \leq \alpha 1 \leq 1)$$

$$\alpha 2 = 1 - \alpha 1 \tag{11}$$

$T_{END}$ is a constant that is set such that the inequality $(0 \leq \alpha 1 \leq 1)$ is satisfied.

After calculating the control ratios $\alpha 1$ and $\alpha 2$, the CPU of the first ECU 30 ends the control ratio calculation.

In the control cycle where the elapsed time t is 0, the braking force difference control ratio $\alpha 1$ is calculated as 1, and the vehicle state quantity FB ratio $\alpha 2$ is calculated as 0 at S660A. If the judgment flag is set at S610 so that it is judged that the countersteering control is currently performed, and it is judged that there is a left-and-right braking force difference is present at S650, the process moves to S655. At S655, the elapsed time t (timer) is incremented. That is, a control cycle of the flowchart of FIG. 6 is incremented, and the process is moved to S660A. When judging that there is no braking force difference at S650, the CPU of the first ECU 30 proceeds to step S670.

In the second embodiment, the elapsed time t is cleared to zero at S640A after it is judged that the braking force difference is present at S620 and the judgment flag indicating that the countersteering control is currently performed is set at S630. Thereafter, during the countersteering control, the elapsed time t (timer) keeps being incremented. During the countersteering control, the elapsed time ratio calculation is performed to calculate the braking force difference control ratio $\alpha 1$ and the vehicle state quantity FB ratio $\alpha 2$.

As a result, unlike the first embodiment, the braking force difference control ratio $\alpha 1$ and the vehicle state quantity FB ratio $\alpha 2$ are changed according directly to the elapsed time t. During the countersteering control, although the braking force difference control ratio $\alpha 1$ is 1 at first, when time elapses in the subsequent control cycle, the braking force difference control ratio $\alpha 1$ has a value less than 1. On the other hand, during the countersteering control, although the vehicle state quantity FB ratio $\alpha 2$ is 0 at first, when time elapses in the subsequent control cycle, the vehicle state quantity FB ratio $\alpha 2$ has a value greater than 0. In this manner, at the initial stage of the countersteering control, the CPU of the first ECU 30 makes the braking force difference control ratio $\alpha 1$ greater, that is, makes the braking force difference control amount θ3 greater (stronger). When the countersteering control is ended, the CPU of the first ECU 30 makes the vehicle state quantity FB ratio $\alpha 2$ greater than the value at the initial stage of the countersteering control, so that the vehicle state quantity FB control amount θa becomes greater (stronger).

At S730, the first ECU 30 calculates the countersteering assist torque τct1 using the equation (8).

$$\tau ct1 = \tau ct \times \alpha 1 \text{ } (\alpha 1: \text{braking force difference control ratio}) \tag{8}$$

Since the countersteering assist torque τct is multiplied by the braking force difference control ratio $\alpha 1$, the corrected countersteering assist torque τct1 is calculated to be changed when time elapses after starting the control during the countersteering control.

In addition to the advantages (1), (3), (6), (7) of the first embodiment, the second embodiment has the following advantages.

(1) In the steering control apparatus 20 according to the second embodiment, the first ECU 30 (the braking force difference control amount calculating section and the vehicle state quantity feedback control amount calculating section) calculates the ratio ($\alpha 2$) of the vehicle state quantity FB control amount $\theta a$ and the ratio ($\alpha 1$) of the braking force difference control amount $\theta 3$ to be added to the ACT angle command value $\theta 0c$, such that ratios $\alpha 1$ and $\alpha 2$ are changed as time elapses from when the control is started.

As a result, during the initial stage of the countersteering control, the braking force difference control amount $\theta 3$ is made greater and the vehicle state quantity FB control amount $\theta a$ is made small. On the other hand, after time has elapsed since the start of the countersteering control, the braking force difference control amount $\theta 3$ is made small, and the vehicle state quantity FB control amount $\theta a$ is made greater. In this manner, since the braking force difference control amount $\theta 3$ added to the ACT angle command value $\theta 0c$ is great at the initial stage of the countersteering control, the vehicle is prevented from deflecting toward a side of higher friction coefficient. When time has elapsed after the countersteering control is started, the braking force difference control amount $\theta 3$ is decreased, and the vehicle state quantity FB control amount $\theta a$ is increased. This prevents unstable behavior of the vehicle that is not caused by braking.

(2) In the second embodiment, the first ECU 30 (correcting variable of the steered torque control amount calculating section) calculates the countersteering assist current command value (Ict: correcting variable of the steered torque control amount) such that the current command value changes in accordance with the elapsed time from when the braking is started.

In this case, the first ECU 30 (steered torque control section) adds the countersteering assist current command value, which corresponds to the elapsed time since the start of the control, to the assist current command value (steered torque control amount), thereby controlling the steered torque. As a result, the driver is encouraged to apply countersteering in accordance with the elapsed time since the start of the control. Accordingly, deflection of the vehicle is easily prevented.

Figure 14:
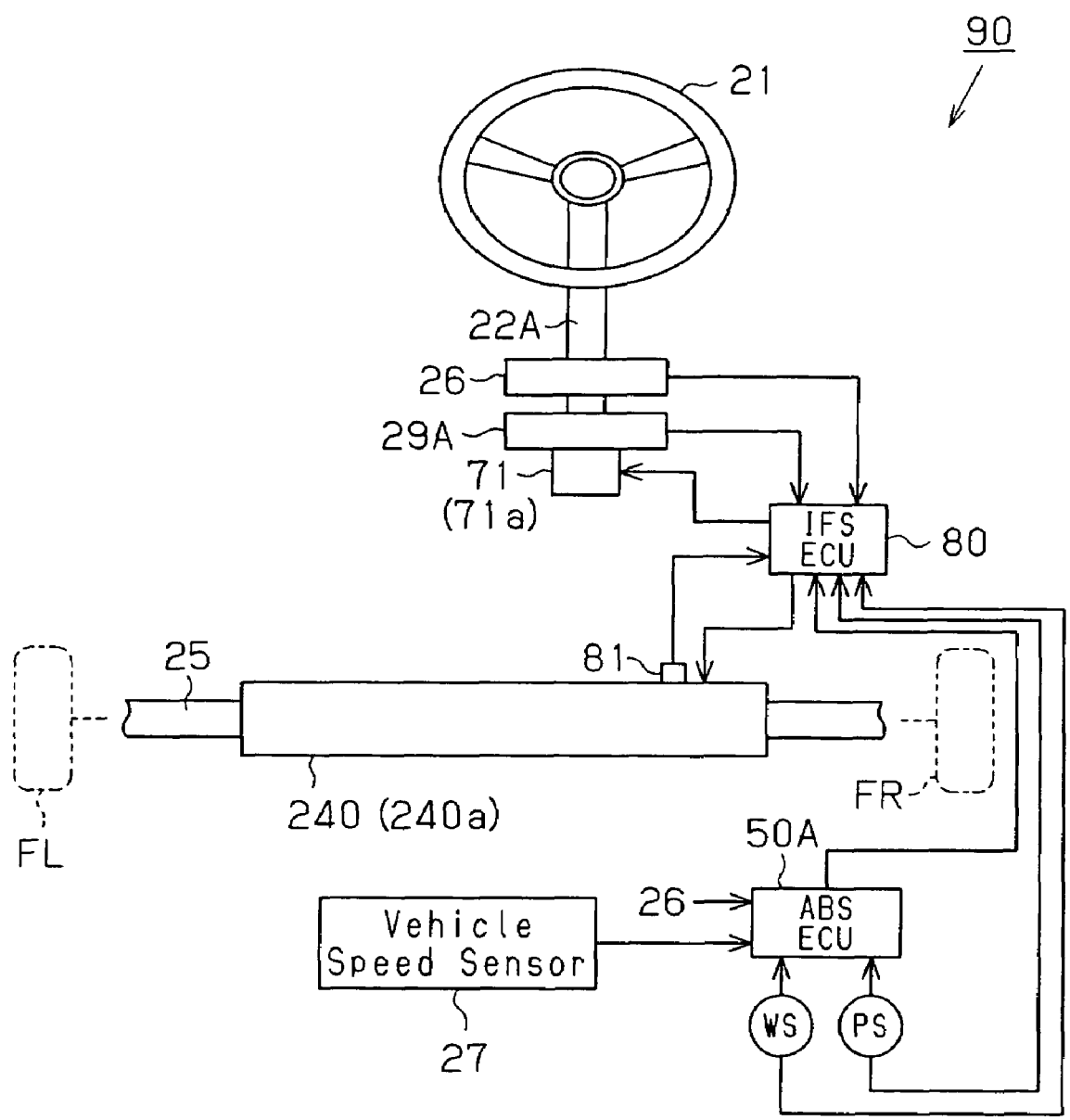
FIG. 14 is a diagrammatic view illustrating a steering control apparatus 90 according to a third embodiment of the present invention.
Figure 15:
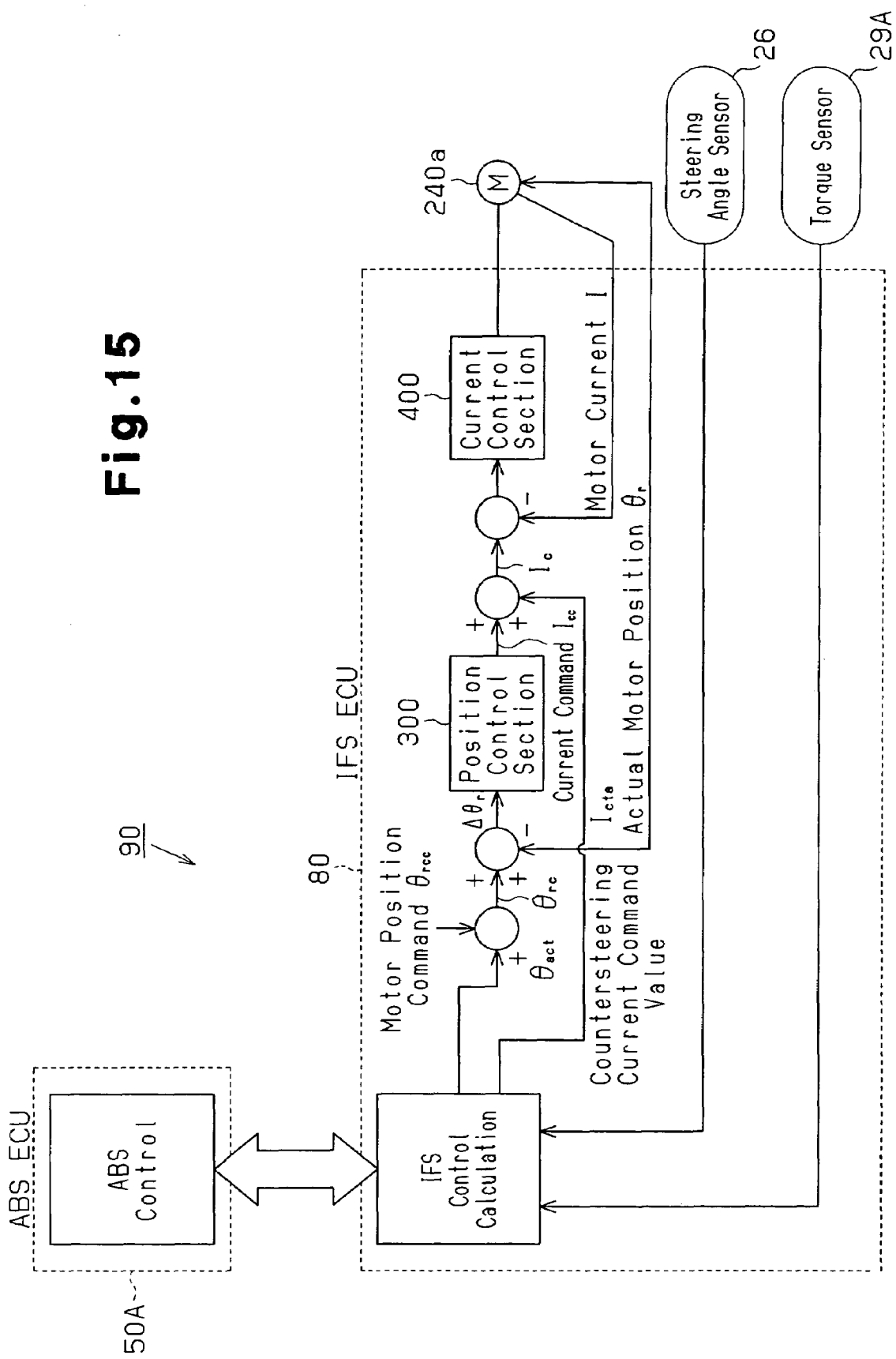
FIG. 15 is a control block diagram showing the steering control apparatus 90 shown in FIG. 14.
Figure 16:
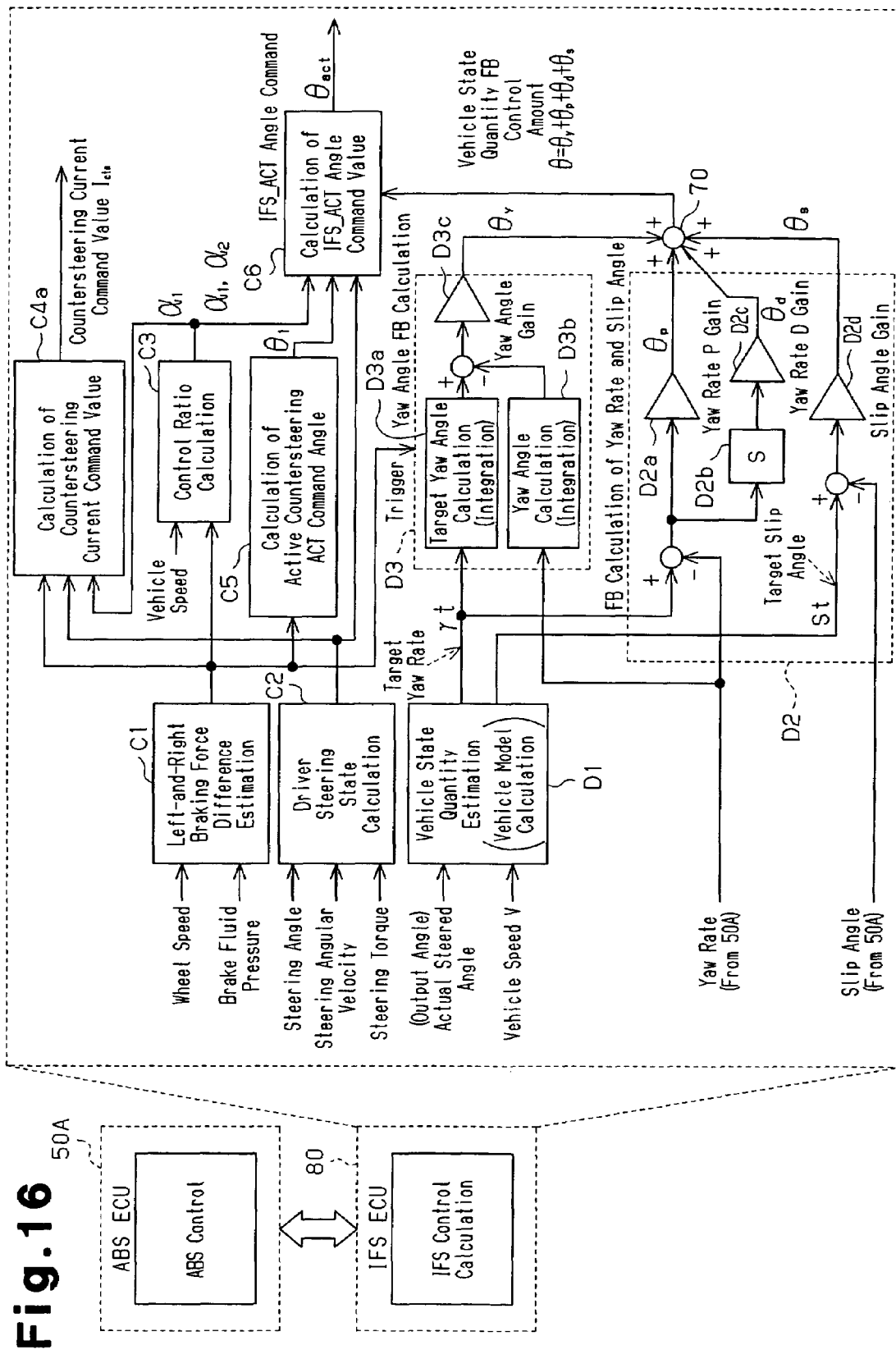
FIG. 16 is a control block diagram showing the IFSECU 80 according to the embodiment shown in FIG. 14.
Figure 17:
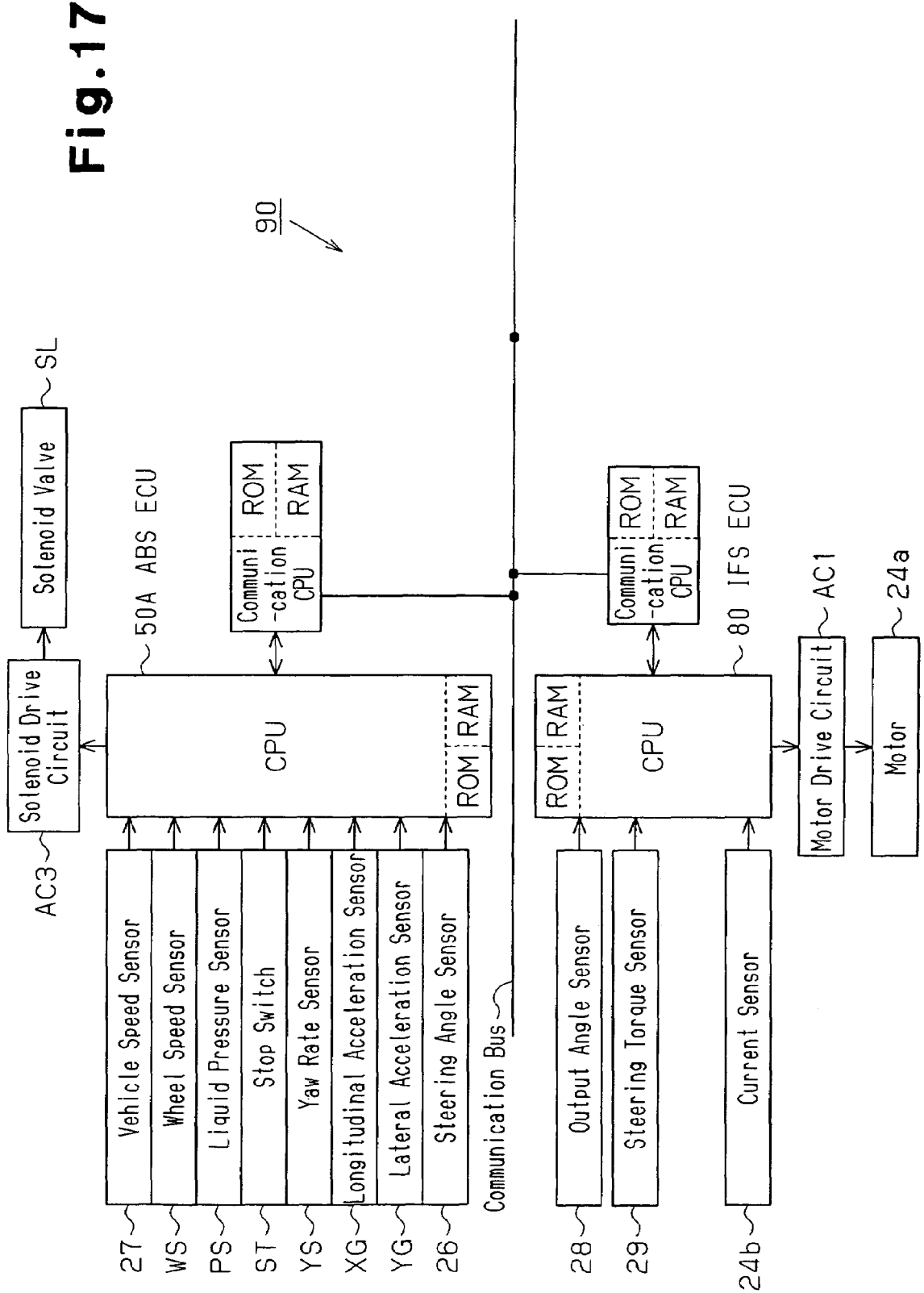
FIG. 17 is an electrical block diagram showing the steering control apparatus 90 according to the embodiment shown in FIG. 14.

A third embodiment according to the present invention will now be described with reference to FIGS. 14 to 18. FIG. 14 schematically shows a vehicle steering control apparatus of a steer-by-wire type. FIG. 15 shows the control blocks of the steering control apparatus 90. FIG. 16 shows the control blocks of the IFSECU 80. FIG. 17 shows the electrical blocks of the steering control apparatus 90. Like or the same reference numerals are given to those components that are like or the same as the corresponding components of the first embodiment.

As shown in FIG. 14, a vehicle steering control apparatus (hereinafter, referred to as steering control apparatus 90) includes a steering wheel 21, a steering shaft 22A, a rod 25, a steering angle sensor 26, a vehicle speed sensor 27, a steering torque sensor 29A, and a counter force actuator 71. By manipulating the steering wheel 21, the steering shaft 22A is rotated. To apply steering counter force required to manipulate the steering wheel 21, the counter force actuator 71 is provided for applying torque to the steering shaft 22A. The counter force actuator 71, for example, includes a motor 71a, which is, for example, a brushless motor. The motor 71a has an output shaft that is integrated with the steering shaft 22A.

A steering torque signal detected by the steering torque sensor 29A is sent to the IFSECU 80. A steering actuator 240 has the same construction as the EPS actuator 24 of the first embodiment, and includes a motor 240a that is coaxial with the rod 25.

The IFSECU 80, which is shown in FIG. 17, includes a CPU, ROM, and RAM (none of which is shown). The IFSECU 80 is connected to an ABSECU 50A through a communication unit and a communication bus, so that communication of various data is possible. The ABSECU 50A includes functions similar to those of the third ECU 50 of the first embodiment. The ABSECU 50A is connected to and receives detection signals from various sensors. The ABSECU 50A is therefore capable of performing data communication of detection signals needed for various control procedures. For example, the ABSECU 50A is connected to the steering angle sensor 26 and the vehicle speed sensor 27, and receives a steering angle signal and a vehicle speed signal. The ABSECU 50A sends these signals to the IFSECU 80 as communication data. Other than the steering torque sensor 29A, the IFSECU 80 is connected to and receives a signal from a current sensor (not shown). The current sensor detects motor current of the motor 240a, which is subject to control (the current is shown as an actual motor current value I in FIG. 15).

When the steering torque is not zero, the IFSECU 80 controls the counter force actuator 71 to generate a target counter force torque, or a steering counter force. As the steering angle is decreased and the vehicle speed V is decreased, the IFSECU 80 decreases the absolute value of the target counter force torque. The torque generated by the counter force actuator 71 is controlled such that a value obtained by subtracting the steering torque from the target counter force torque becomes zero. Accordingly, the driver has a steering feel that is similar to a steering feel given by an electric power steering apparatus.

(Steering Control by IFSECU 80)

The IFSECU 80 determines a target steered angle (steered amount) of the steered wheels FR, FL on the basis of the steering angle detected by the steering angle sensor 26, the steering torque detected by the steering torque sensor 29A, and the vehicle speed V detected by the vehicle speed sensor 27. Then, the IFSECU 80 controls the EPS actuator 24 such that the steered angle of the steered wheels FR, FL seeks the target steered angle (steered amount).

The operation of the IFSECU 80 will now be described with reference to FIG. 15.

On the basis of the steering angle detected by the steering angle sensor 26 and the vehicle speed detected by the vehicle speed sensor 27, the IFSECU 80 calculates a target steered angle. The target steered angle is set as a function of the steering angle and the vehicle speed V. For example, the ratio of the target steered angle to the steering angle is decreased as the vehicle speed V is increased.

The IFSECU 80 calculates the target steered angle as a position command (a motor position command $\theta rcc$ in FIG. 15). Thereafter, the IFSECU 80 receives a rotation angle signal form a rotation angle sensor 81, which is located on the steering actuator 240 as shown in FIG. 14. The motor position command $\theta rcc$ corresponds to the steering control amount. Based on the rotation angle signal, the IFSECU 80 calculates actual steered angle of the steered wheels FR, FL. The IFSECU 80 performs a first correction process (described below) to the target steered angle, thereby generating a new position command $\theta rc$, which is a new target steered angle (steered amount). The IFSECU 80 calculates a deviation $\Delta\theta r$ between the actual steered angle (the motor actual position $\theta r$ in FIG. 15) and the position command $\theta rc$, which is the new target steered angle (steered amount). The IFSECU 80 then multiplies the deviation $\Delta\theta r$ by a predetermined gain that is needed for the position control in a position control section 300, and sets the resultant as a current command value Icc (that is, a steered torque command).

In this manner, the IFSECU 80 performs the position control (position feedback control), thereby causing the deviation $\Delta\theta r$ between the target steered angle and the feedback value (the actual steered angle) to be 0. The steering control of the motor 24a performed by the IFSECU 80 includes the position control for causing the actual steered angle to correspond to the target steered angle, and steered torque control for causing the motor 24a to generate necessary force, that is, for generating an necessary output torque. The steered torque control is current feedback control.

The IFSECU 80 performs a second correction process to the current command value Icc corresponding to the steered torque command, thereby generating a new current command Ic. The IFSECU 80 receives a motor current I of the motor 24a, which is detected by a current sensor (not shown). The IFSECU 80 calculates the deviation between the current command value Ic and the actual motor current I. The IFSECU 80 subjects the deviation to proportional-plus-integral control at a current control section 400 to generate a motor drive signal, thereby controlling the motor 24a through a motor drive circuit (not shown).

Figure 3:
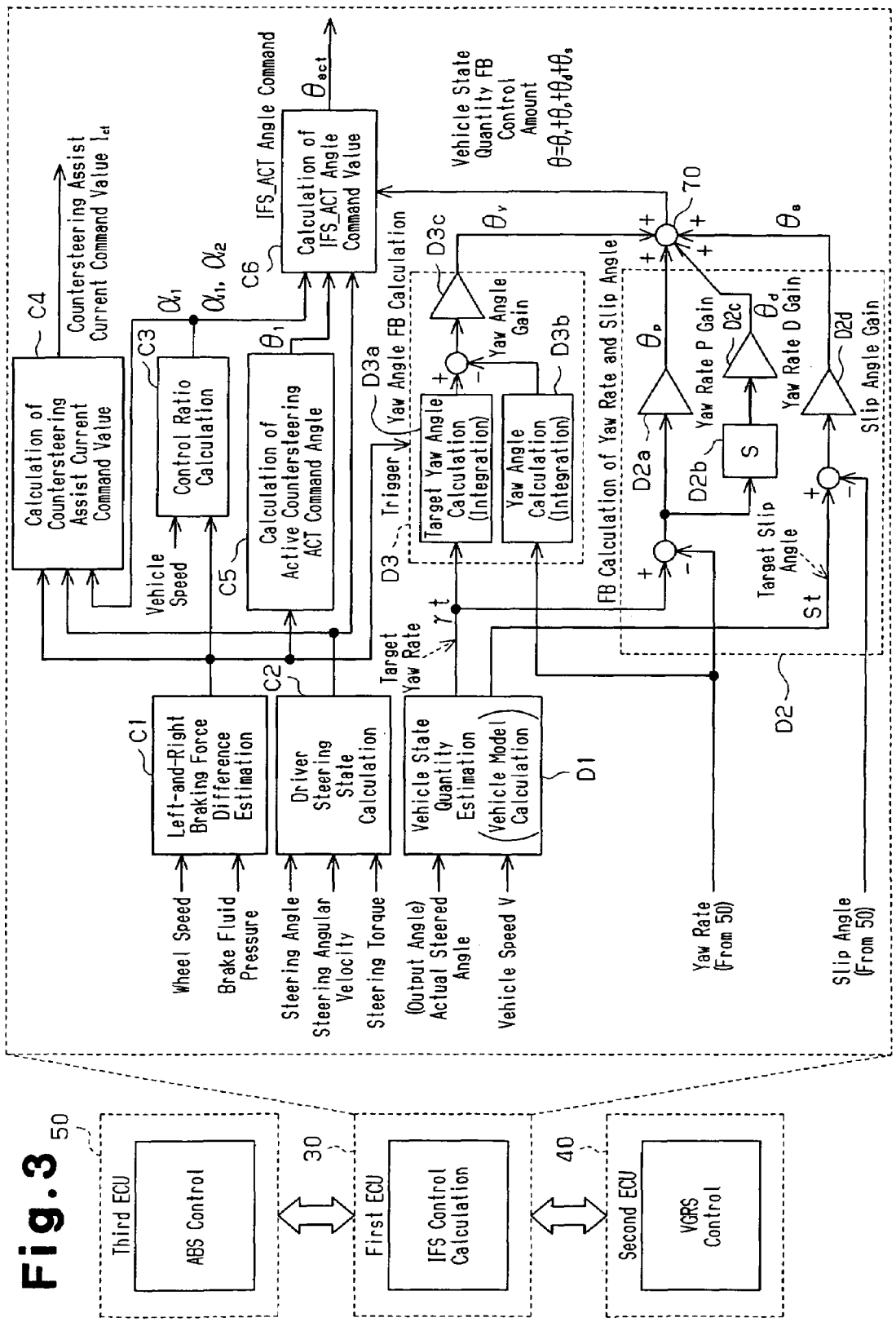
FIG. 3 is a block diagram showing the first ECU 30 according to the embodiment shown in FIG. 1.

The control block diagram of the IFSECU 80 shown in FIG. 16 is different from the configuration of the first embodiment shown in FIG. 3 in that the second ECU 40 is omitted, and that the first ECU 30 and the block C4 are replaced by the IFSECU 80 and a block C4a. That is, the control blocks of the IFSECU 80 are substantially the same as the those of the first ECU 30 of the first embodiment. In the block C4a, a countersteering current command value calculation is performed instead of the countersteering "assist" current command value calculation. The functions of the other blocks are the same as those of the first embodiment, and therefore, the explanation thereof is omitted.

Figure 18:
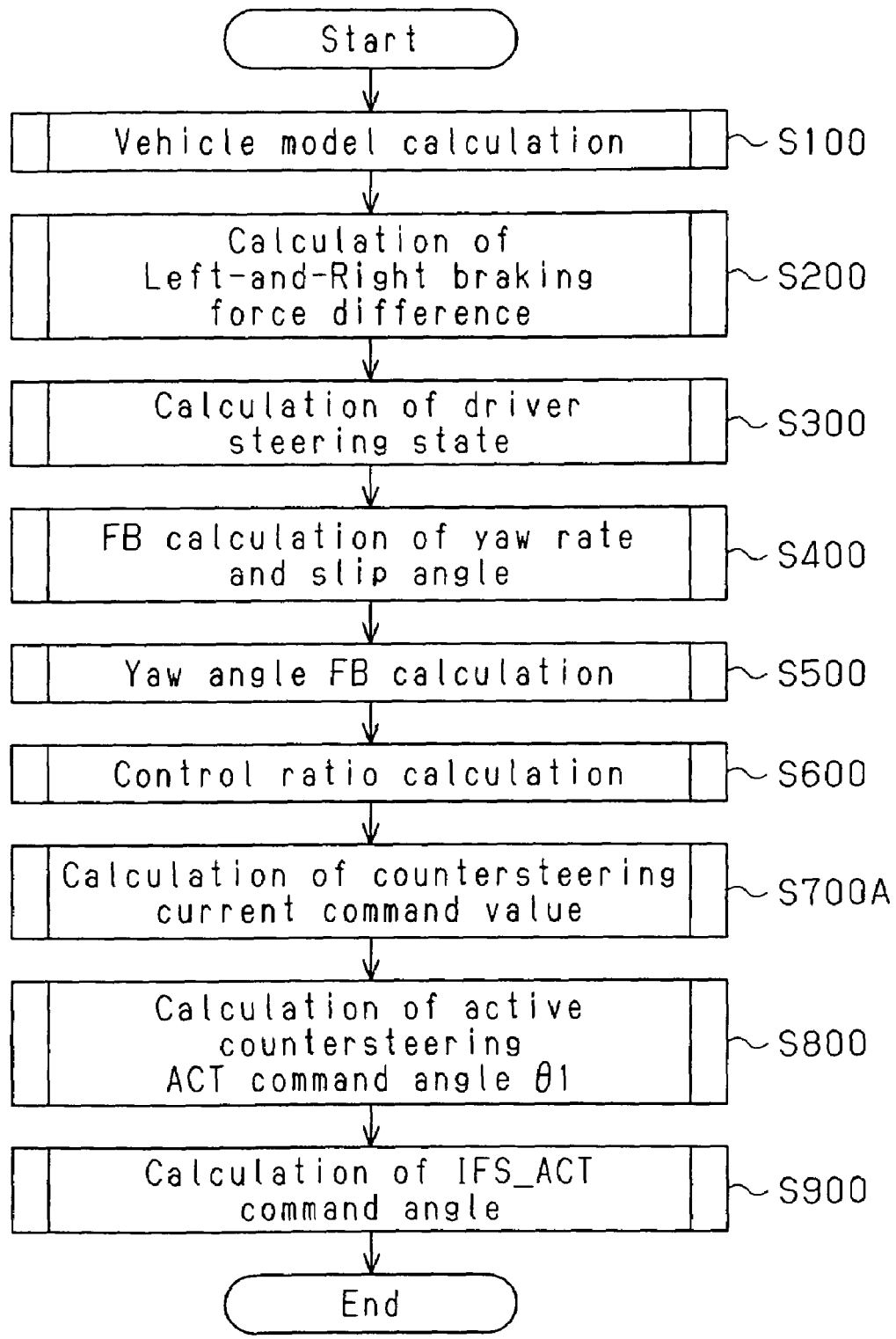
FIG. 18 is a flowchart showing an IFS control calculation program executed by an IFSECU 80 of the steering control apparatus 90 according to the embodiment shown in FIG. 14.

FIG. 18 is a flowchart of an IFS control calculation program executed by the IFSECU 80 at a predetermined cycle. Processes of S100 to S600, S800, and S900 are the same as those in the first embodiment. S700A is a countersteering current command value calculation process. In each step of FIG. 9 of the first embodiment, if "countersteering assist" is replaced by "countersteering", the processes of the first embodiment are the same as those of S700A of the present embodiment. Therefore, the description thereof is omitted.

The IFSECU 80 performs calculation shown in FIG. 18, thereby obtaining the countersteering current command value Icta and the IFS_ACT commanded angle $\theta$act. The IFSECU 80 performs a first correction process to add the IFS_ACT commanded angle $\theta$act to the target steered angle $\theta$rcc, and obtains a new target steered angle (steered amount) $\theta$rc. The IFSECU 80 performs a second correction process to add the countersteering current command value Icta to the current command Icc, and obtains a new current command Ic.

In the third embodiment, the IFSECU 80 corresponds to steering control amount calculating section, braking force difference control amount calculating section, adding section, steered amount control section, vehicle state control amount calculating section, adjusting section, and steering state quantity detecting section in claims 1 to 5.

Accordingly, the third embodiment has the same advantages as the advantages (1), (3), (4), (6), and (7) of the first embodiment.

The invention may be embodied in the following forms.

(1) If the brushless DC motor is used as the motor 24a as in the first embodiment, a rotation angle sensor may be provided to the motor 24a. In this case, the block A0 performs the IFS control based on a detection signal of the rotation angle sensor. For example, a rack and pinion in the steering gear box 31 may be provided with the steered angle sensor, and the steered angle may be obtained based on the detection signal.

(2) In the first embodiment, the control ratio calculation block (S600) calculates the braking force difference control ratio $\alpha 1$ and the vehicle state quantity FB ratio $\alpha 2$ using the vehicle ratio calculation equation (5) and the equation (6). However, other equations may be used. That is, at the initial stage of the countersteering control, the braking force difference control ratio $\alpha 1$ may be made great, so that the control of the braking force difference is increased (strengthened). When the countersteering control is ended, the vehicle state quantity FB ratio $\alpha 2$ may be greater than the initial value, so that the vehicle state quantity FB control amount is increased.

For example, the following equations may be used.

$$\alpha 1 = \sqrt{(V/V0)}, \alpha 2 = 1 - \alpha 1 \qquad 1)$$

$$\alpha 1 = \sqrt{(V/V0)}, \alpha 2 = 1 - V/V0 \qquad 2)$$

In the case of 2), when the countersteering controlled is ended as the vehicle speed V is decreased, the vehicle state quantity FB ratio $\alpha 2$ is increased to increase the vehicle state quantity FB control amount compared to the case 1).

(3) In the second embodiment, $\alpha 1$ and $\alpha 2$ are computed using the equations (10) and (11). However, the sum of $\alpha 1$ and $\alpha 2$ does not need to be 1. $\alpha 1$ and $\alpha 2$ may be obtained using the following equations.

$$\alpha 1 = 1 - \sqrt{(t/T_{END})}, \alpha 2 = 1 - \alpha 1$$

Alternatively, the following equation may be used.

$$\alpha 1 = 1 - \sqrt{(t/T_{END})}, \alpha 2 = \sqrt{(t/T_{END})}$$

In either case, inequalities $0 \leq \alpha 1 \leq 1$, $0 \leq \alpha 2 \leq 1$ are satisfied, and $T_{END}$ is a constant that is set such that the inequality $0 \leq \alpha 1 \leq 1$ is satisfied.

(3) Embodiment of Claim 12

In the first embodiment, $\beta 4$ has value close to 0. However, $\beta 4$ may be set at 0. In this case, the braking force difference control amount $\theta 3$ is zero, and the control using the braking force difference control amount is not performed. That is, when the driver is turning the steering wheel 21 in a direction opposite to the direction canceling yaw moment due to the left-and-right braking force difference, the intention of the driver is given a higher priority and the vehicle behavior is not controlled if the steering angular velocity is increased.

(4) Embodiment of Claim 11 (Steering State Detecting Section: Detection of Steering Amount)

In the first embodiment, when the driver is applying countersteering in a direction canceling yaw moment due to a left-and-right braking force difference, the driver steering state correction factor $\beta$ is changed according to the steering angular velocity. Instead, the following equation may be used.

$$\theta 3 = \theta 2 \times \beta a = (\theta 1 \times \alpha 1) \times \beta a$$

βa (0<βa≦1) is a driver steering state correction factor. The driver steering state correction factor βa is changed according to the steering amount, for example, the steering angle when the driver is applying countersteering in a direction canceling yaw moment due to the braking force difference. In this case, the driver steering state correction factor βa has a small value when the steering angle is great compared to a case where the steering angle is small.

(5) Embodiment of Claim 12 (Steering State Detecting Section: Detection of Steering Amount)

In the first embodiment, when the driver is applying countersteering in a direction opposite to the direction canceling yaw moment due to a left-and-right braking force difference, the driver steering state correction factor β is changed according to the steering angular velocity. Instead, the following equation may be used.

$$θ3=θ2×βa=(θ1×α1)×βa$$

βa (0≦βa≦1) is a driver steering state correction factor. The driver steering state correction factor βa is changed according to the steering amount, for example, the steering angle when the driver is applying countersteering in a direction opposite to the direction canceling yaw moment due to a left-and-right braking force difference. In this case, the driver steering state correction factor βa has a great value when the steering angle is great, and has a value close to or equal to zero when the steering angle is small.

(6) Embodiment of Claim 11

In the first embodiment, the first ECU 30 (the steering state detecting section) of the steering control apparatus 20 detects the steering state of the driver based on the steering angular velocity (steering speed) of the steering wheel 21. When the driver turns the steering wheel 21 in a direction canceling yaw moment due to a left-and-right braking force difference, the first ECU 30 (the braking force difference control amount calculating section) decreases the braking force difference control amount θ3 according to the steering angular velocity. In addition to this configuration, when the driver turns the steering wheel 21 in a direction canceling yaw moment due to a left-and-right braking force difference, the first ECU 30 (correcting variable of the steered torque control amount calculating section) may decrease the correcting variable of the steered torque control amount.

In this case, the following equation of S730 of the first embodiment does not need to be used.

$$τct1=τct×α1 \text{ (braking force difference control ratio)} \quad (8)$$

Instead, the following equation (12) is used.

$$τct1=τct×α1 \text{ (braking force difference control ratio)}×β \quad (12)$$

β is a driver steering state correction factor. The order of S700 and S800 in FIG. 6 is inverted, and the driver steering state correction factor β obtained at S800 is used in the equation (12).

In this case, the countersteering assist torque τct1 is decreased in accordance with the steering angular velocity. That is, the countersteering assist current command value (Ict: the correcting variable of the steered torque control amount) is decreased. As a result, the countersteering assist torque is suppressed, and the control level of the deflection of the vehicle is prevented from being excessive by the interference between the driver and the countersteering. Accordingly, the behavior of the vehicle is optimized.

As in the above described modified embodiment (4), the driver steering state correction factor βa may be used instead of the driver steering state correction factor β. In this case, the driver steering state correction factor βa has a great value when the steering angle is great, and has a value close to or equal to zero when the steering angle is small. In this case also, the same operations and advantages as listed above are provided.

(7) Embodiment of Claim 12

In the first embodiment, the first ECU 30 (the steering state detecting section) of the steering control apparatus 20 detects the steering state of the driver based on the steering angular velocity (steering speed) of the steering wheel 21. When the driver turns the steering wheel 21 in a direction opposite to the direction canceling yaw moment due to a left-and-right braking force difference, the first ECU 30 (the braking force difference control amount calculating section) decreases the braking force difference control amount θ3. In addition to this configuration, when the driver turns the steering wheel 21 in a direction opposite to the direction canceling yaw moment due to a left-and-right braking force difference, the first ECU 30 (correcting variable of the steered torque control amount calculating section) may decrease the correcting variable of the steered torque control amount.

In this case, the following equation of S730 of the first embodiment does not need to be used.

$$τct1=τct×α1 \text{ (braking force difference control ratio)} \quad (8)$$

Instead, the following equation (12) is used.

$$τct1=τct×α1 \text{ (braking force difference control ratio)}×β \quad (12)$$

β is a driver steering state correction factor. The order of S700 and S800 in FIG. 6 is inverted, and the driver steering state correction factor β obtained at S800 is used in the equation (12).

In this case, the countersteering assist torque τct1 is decreased in accordance with the steering angular velocity. That is, the countersteering assist current command value (Ict: the correcting variable of the variable of the steered torque control amount) is decreased. As a result, when the driver intends to turn the vehicle in a direction opposite to the direction canceling the moment due to a left-and-right braking force difference, the assist steering torque of the countersteering is suppressed, and the intention of the driver is given a higher priority.

As in the above described modified embodiment (4), the driver steering state correction factor βa may be used instead of the driver steering state correction factor β. In this case, the driver steering state correction factor βa has a great value when the steering angle is great, and has a value close to or equal to zero when the steering angle is small. In this case, the countersteering assist torque τct1 is decreased or becomes 0 according to the steering amount. That is, the countersteering assist current command value (Ict: the correcting variable of the variable of the steered torque control amount) is decreased or becomes 0.

Therefore, when the driver intends to turn the vehicle in a direction opposite to the direction canceling the moment due to a left-and-right braking force difference, the assist steering torque of the countersteering is suppressed, and the intention of the driver is given a higher priority.

In this embodiment also, when the driver turns the steering wheel 21 in a direction opposite to the direction canceling yaw moment due to a left-and-right braking force difference, the first ECU 30 (the braking force difference control amount calculating section) decreases the braking force difference control amount θ3 to 0.

(8) In the first and second embodiments, the countersteering assist current command value calculation is performed in the block C4 of FIG. 3. However, the block C4 may be omitted. That is, S700 of FIG. 6 may be omitted. In this case, the second ECU 40 corresponds to the adding section of claim 1.

(9) In the third embodiment, the countersteering current command value calculation is performed. However, the calculation may be omitted. That is, S700A of FIG. 18 may be omitted.

The invention claimed is:

1. A steering control apparatus for a vehicle, the vehicle having left and right wheels to which braking force is applied, a steering section, and a steered wheel that is steered by steering of the steering section, the apparatus comprising:
   a steering control amount calculating section that calculates a steering control amount based on the steering amount of the steering section;
   a braking force difference control amount calculating section that estimates the difference between braking force applied to the left wheel and braking force applied to the right wheel, and calculates a braking force difference control amount according to the braking force difference to cancel yaw moment that acts on the vehicle due to the braking force difference;
   a vehicle state control amount calculating section that calculates a target yaw rate and a target yaw angle based on a vehicle state quantity, calculates a yaw rate feedback amount based on the deviation between the target yaw rate and an actual yaw rate, calculates a yaw angle feedback amount based on the deviation between the target yaw angle and an actual yaw angle, adds the yaw rate feedback amount to the yaw angle feedback amount, and calculates a vehicle state control amount based on the result of the addition;
   an adding section that adds the braking force difference control amount and the vehicle state control amount to the steering control amount;
   a steered amount controlling section that determines a steered amount by which the steered wheel is steered based on the addition result of the adding section; and
   an adjusting section that, according to a change in a vehicle speed or to time elapsed from when braking started to be applied to the left and right wheels, adjusts a ratio related to the braking force difference control amount to be added to the steering control amount, and a ratio related to the vehicle state control amount to be added to the steering control amount.

2. The apparatus according to claim 1, wherein, when the vehicle speed is reduced or when the elapsed time is increased, the adjusting section decreases the braking force difference control amount and increases the vehicle state control amount.

3. The apparatus according to claim 1, further comprising a steering state detecting section that determines whether the steering section has been steered to cancel the yaw moment based on at least one of a steering amount and a steering speed of the steering section, wherein, when the steering state detecting section determines that the steering section has been steered to cancel the yaw moment, the braking force difference control amount calculating section decreases the braking force difference control amount.

4. The apparatus according to claim 3, wherein the braking force difference control amount calculating section decreases the braking force difference control amount as the steering amount or the steering speed is increased.

5. The apparatus according to claim 1, further comprising a steering state detecting section that determines whether the steering section has been steered not to cancel the yaw moment based on at least one of a steering amount and a steering speed of the steering section, wherein, when the steering state detecting section determines that the steering section has been steered not to cancel the yaw moment, the braking force difference control amount calculating section decreases the braking force difference control amount.

6. A steering control apparatus for a vehicle, the vehicle having left and right wheels to which braking force is applied, a steering section, and a steered wheel that is steered by steering of the steering section, the apparatus comprising:
   a steering control amount calculating section that calculates a steering control amount based on the steering amount of the steering section;
   a steered torque control amount calculating section that calculates a steered torque control amount based on steering torque of the steering section;
   a braking force difference control amount calculating section that estimates the difference between braking force applied to the left wheel and braking force applied to the right wheel, and calculates a braking force difference control amount according to the braking force difference to cancel yaw moment that acts on the vehicle due to the braking force difference;
   a correction amount calculating section that calculates a correction amount related to the steered torque control amount according to the braking force difference, thereby canceling the yaw moment;
   a first adding section that adds the braking force difference control amount to the steering control amount;
   a second adding section that adds the correction amount to the steered torque control amount;
   a steered amount controlling section that determines a steered amount by which the steered wheel is steered based on the addition result of the first adding section; and
   a steered torque controlling section that determines steered torque to be applied to the steered wheel based on the addition result of the second adding section.

7. The apparatus according to claim 6, further comprising a vehicle state control amount calculating section that calculates a target yaw rate and a target yaw angle based on a vehicle state quantity, calculates a yaw rate feedback amount based on the deviation between the target yaw rate and an actual yaw rate, calculates a yaw angle feedback amount based on the deviation between the target yaw angle and an actual yaw angle, adds the yaw rate feedback amount to the yaw angle feedback amount, and calculates a vehicle state control amount based on the result of the addition,
   wherein the first adding section adds the vehicle state control amount to the steering control amount.

8. The apparatus according to claim 7, further comprising an adjusting section that, according to a change in a vehicle speed or to time elapsed from when braking started to be applied to the left and right wheels, adjusts a ratio related to the braking force difference control amount to be added to the steering control amount, and a ratio related to the vehicle state control amount to be added to the steering control amount.

9. The apparatus according to claim 6, wherein the correction amount calculating section changes the correction amount according to a change in the vehicle speed.

10. The apparatus according to claim 6, wherein the correction amount calculating section changes the correction amount according to time elapsed from when braking started to be applied to the left and right wheels.

11. The apparatus according to claim 6, further comprising a steering state detecting section that determines whether the steering section has been steered to cancel the yaw moment based on at least one of a steering amount and a steering speed of the steering section, wherein, when the steering state detecting section determines that the steering section has been steered to cancel the yaw moment, the braking force difference control amount calculating section decreases the braking force difference control amount or sets the braking force difference control amount to zero, and the correction amount calculating section decreases the correction amount or sets the correction amount to zero.

12. The apparatus according to claim 6, further comprising a steering state detecting section that determines whether the steering section has been steered not to cancel the yaw moment based on at least one of a steering amount and a steering speed of the steering section, wherein, when the steering state detecting section determines that the steering section has been steered not to cancel the yaw moment, the braking force difference control amount calculating section decreases the braking force difference control amount or sets the braking force difference control amount to zero, and the correction amount calculating section decreases the correction amount or sets the correction amount to zero.

13. A steering control apparatus for a vehicle, the vehicle having left and right wheels to which braking force is applied, a steering section, and a steered wheel that is steered by steering of the steering section, wherein the apparatus:
calculates a steering control amount based on the steering amount of the steering section;
estimates the difference between braking force applied to the left wheel and braking force applied to the right wheel, and calculates a braking force difference control amount according to the braking force difference to cancel yaw moment that acts on the vehicle due to the braking force difference;
calculates a target yaw rate and a target yaw angle based on a vehicle state quantity, calculates a yaw rate feedback amount based on the deviation between the target yaw rate and an actual yaw rate, calculates a yaw angle feedback amount based on the deviation between the target yaw angle and an actual yaw angle, calculates a vehicle state control amount based on the yaw rate feedback amount and the yaw angle feedback amount;
obtains a steered amount by which the steered wheel is steered based on the braking force difference control amount, the vehicle state control amount, and the steering control amount; and
changes the magnitude of the braking force difference control amount and the magnitude of the vehicle state control amount according to a vehicle speed or to time elapsed from when braking started to be applied to the left and right wheels.

14. A steering control apparatus for a vehicle, the vehicle having left and right wheels to which braking force is applied, a steering section, and a steered wheel that is steered by steering of the steering section, wherein the apparatus:
calculates a steering control amount based on the steering amount of the steering section;
calculates a steered torque control amount based on steering torque of the steering section;
estimates the difference between braking force applied to the left wheel and braking force applied to the right wheel, and calculates a braking force difference control amount and a correction value related to the steered torque control amount according to the braking force difference to cancel yaw moment that acts on the vehicle due to the braking force difference;
obtains a steered amount by which the steered wheel is steered based on the braking force difference control amount and the steering control amount; and
obtains a steered torque to be applied to the steered wheel based on the correction amount and the steered torque control amount.

15. A steering control method for a vehicle, the vehicle having left and right wheels to which braking force is applied, a steering section, and a steered wheel that is steered by steering of the steering section, the method comprising:
calculating a steering control amount based on the steering amount of the steering section;
estimating the difference between braking force applied to the left wheel and braking force applied to the right wheel;
calculating a braking force difference control amount according to the braking force difference to cancel yaw moment that acts on the vehicle due to the braking force difference;
calculating a target yaw rate and a target yaw angle based on a vehicle state quantity;
calculating a yaw rate feedback amount based on the deviation between the target yaw rate and an actual yaw rate;
calculating a yaw angle feedback amount based on the deviation between the target yaw angle and an actual yaw angle;
calculating a vehicle state control amount based on the yaw rate feedback amount and the yaw angle feedback amount;
obtaining a steered amount by which the steered wheel is steered based on the braking force difference control amount, the vehicle state control amount, and the steering control amount; and
changing the magnitude of the braking force difference control amount and the magnitude of the vehicle state control amount according to a vehicle speed or to time elapsed from when braking started to be applied to the left and right wheels.

16. A steering control method for a vehicle, the vehicle having left and right wheels to which braking force is applied, a steering section, and a steered wheel that is steered by steering of the steering section, the method comprising:
calculating a steering control amount based on the steering amount of the steering section;
calculating a steered torque control amount based on steering torque of the steering section;
estimating the difference between braking force applied to the left wheel and braking force applied to the right wheel;
calculating a braking force difference control amount and a correction value related to the steered torque control amount according to the braking force difference to cancel yaw moment that acts on the vehicle due to the braking force difference;
obtaining a steered amount by which the steered wheel is steered based on the braking force difference control amount and the steering control amount; and
obtaining a steered torque to be applied to the steered wheel based on the correction amount and the steered torque control amount.

* * * * *